(12) United States Patent
Chen et al.

(10) Patent No.: US 11,194,127 B2
(45) Date of Patent: Dec. 7, 2021

(54) PHOTOGRAPHING OPTICAL LENS ASSEMBLY, IMAGING APPARATUS AND ELECTRONIC DEVICE

(71) Applicant: LARGAN PRECISION CO., LTD., Taichung (TW)

(72) Inventors: Chun-Yen Chen, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 68 days.

(21) Appl. No.: 16/377,385

(22) Filed: Apr. 8, 2019

(65) Prior Publication Data

US 2020/0057268 A1 Feb. 20, 2020

(30) Foreign Application Priority Data

Aug. 15, 2018 (TW) .................. 107128500

(51) Int. Cl.
*G02B 13/00* (2006.01)
*G02B 27/00* (2006.01)
*G02B 9/62* (2006.01)

(52) U.S. Cl.
CPC .......... *G02B 13/0045* (2013.01); *G02B 9/62* (2013.01); *G02B 27/0025* (2013.01)

(58) Field of Classification Search
CPC .. G02B 13/00; G02B 13/0045; G02B 13/002; G02B 13/0015; G02B 13/18; G02B 13/04; G02B 7/04; G02B 3/04; G02B 9/62; G02B 27/00; G02B 27/0025; G02B 27/64; G02B 27/646; G02B 5/20; G02B 5/208; G02B 5/005

USPC ........ 359/713, 658, 740, 752, 756, 761, 762
See application file for complete search history.

(56) References Cited

U.S. PATENT DOCUMENTS

| | | | |
|---|---|---|---|
| 9,791,667 B2 | 10/2017 | Son | |
| 9,952,412 B2 | 4/2018 | Hsueh et al. | |
| 10,007,093 B2 | 6/2018 | Chen et al. | |
| 10,073,249 B2 | 9/2018 | Huang | |
| 10,345,555 B2 | 7/2019 | Dai | |
| 2014/0376107 A1 | 12/2014 | Son | |
| 2015/0268446 A1* | 9/2015 | Chen | G02B 13/0045 348/148 |
| 2018/0239113 A1 | 8/2018 | Dai | |
| 2019/0154966 A1 | 5/2019 | Nitta | |

FOREIGN PATENT DOCUMENTS

| | | |
|---|---|---|
| CN | 104252031 A | 12/2014 |
| CN | 205485028 U | 8/2016 |
| CN | 106019535 A | 10/2016 |
| KR | 101792345 B1 | 11/2017 |

(Continued)

*Primary Examiner* — Jie Lei
(74) *Attorney, Agent, or Firm* — McClure, Qualey & Rodack, LLP

(57) ABSTRACT

A photographing optical lens assembly includes six lens elements, which are, in order from an object side to an image side, a first lens element, a second lens element, a third lens element, a fifth lens element and a sixth lens element. The first lens element with negative refractive power has an object-side surface being concave in a paraxial region thereof. The sixth lens element has an image-side surface being concave in a paraxial region thereof and includes at least one convex shape in an off-axis region thereof.

27 Claims, 21 Drawing Sheets

(56) References Cited

FOREIGN PATENT DOCUMENTS

| KR | 101792345 B2 | 11/2017 |
| TW | I585456 B | 6/2017 |
| TW | I588526 B | 6/2017 |
| TW | 201814348 A | 4/2018 |
| WO | 2018010246 A1 | 1/2018 |

* cited by examiner

PHOTOGRAPHING OPTICAL LENS ASSEMBLY, IMAGING APPARATUS AND ELECTRONIC DEVICE

RELATED APPLICATIONS

This application claims priority to Taiwan Application Serial Number 107128500, filed Aug. 15, 2018, which is herein incorporated by reference.

BACKGROUND

Technical Field

The present disclosure relates to a photographing optical lens assembly, an image apparatus, and an electronic device. More particularly, the present disclosure relates to a compact photographing optical lens assembly and an image apparatus which are applicable to electronic devices.

Description of Related Art

With the advanced semiconductor manufacturing technologies, the performances of image sensors are enhanced, and the pixel size is minimized. Therefore, photographing optical lens assemblies with high image quality become indispensable. Moreover, with the rapid scientific and technological progress, the application scope of electronic devices equipped with photographing optical lens assemblies becomes wider, and the requirements for photographing optical lens assemblies are more diverse. However, it is hard for balancing the requirements, such as image quality, sensitivity, aperture size, volume and field of view, in conventional photographing optical lens assemblies. Thus, there is a need for a photographing optical lens assembly to satisfy the aforementioned desired requirements.

SUMMARY

According to one aspect of the present disclosure, a photographing optical lens assembly includes six lens elements, the six lens elements being, in order from an object side to an image side, a first lens element, a second lens element, a third lens element, a fourth lens element, a fifth lens element and a sixth lens element. The first lens element with negative refractive power has an object-side surface being concave in a paraxial region thereof. The sixth lens element has an image-side surface being concave in a paraxial region thereof and the image-side surface includes at least one convex shape in an off-axis region thereof. When a curvature radius of the object-side surface of the first lens element is R1, a curvature radius of an image-side surface of the first lens element is R2, an Abbe number of the second lens element is V2, an Abbe number of the fourth lens element is V4, and an Abbe number of the sixth lens element is V6, the following conditions are satisfied:

$(R1+R2)/(R1-R2)<0.40$; and $10<V2+V4+V6<85$.

According to another aspect of the present disclosure, an image apparatus includes the photographing optical lens assembly according to the aforementioned aspect and an image sensor disposed on an image surface of the photographing optical lens assembly.

According to another aspect of the present disclosure, an electronic device includes the image apparatus according to the foregoing aspect.

According to another aspect of the present disclosure, a photographing optical lens assembly includes six lens elements, the six lens elements being, in order from an object side to an image side, a first lens element, a second lens element, a third lens element, a fourth lens element, a fifth lens element and a sixth lens element. The first lens element with negative refractive power has an object-side surface being concave in a paraxial region thereof and includes at least one convex shape in an off-axis region thereof. The fourth lens element has negative refractive power. The sixth lens element has an image-side surface being concave in a paraxial region thereof and the image-side surface includes at least one convex shape in an off-axis region thereof. When a curvature radius of the object-side surface of the first lens element is R1, a curvature radius of an image-side surface of the first lens element is R2, and a total number of lens elements having Abbe numbers less than 32 is V32, the following conditions are satisfied:

$-2.75<(R1+R2)/(R1-R2)\leq 0$; and $3\leq V32$.

According to another aspect of the present disclosure, an image apparatus includes the photographing optical lens assembly according to the aforementioned aspect and an image sensor disposed on an image surface of the photographing optical lens assembly.

According to another aspect of the present disclosure, an electronic device includes the image apparatus according to the foregoing aspect.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
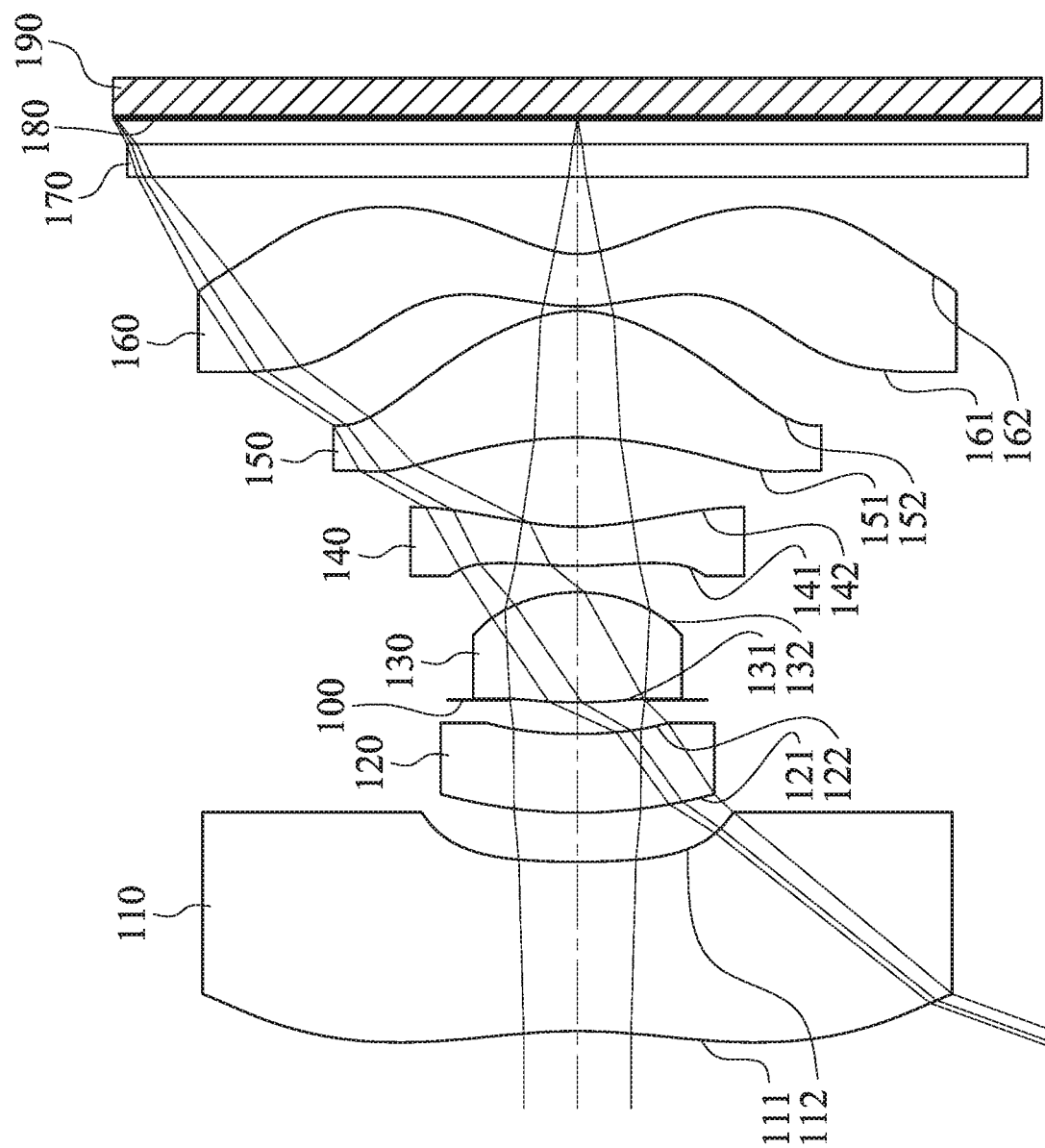
FIG. 1 is a schematic view of an image apparatus according to the 1st embodiment of the present disclosure.

A photographing optical lens assembly includes six lens elements, the six lens elements being, in order from an object side to an image side, a first lens element, a second lens element, a third lens element, a fourth lens element, a fifth lens element and a sixth lens element. The photographing optical lens assembly has a total of six lens elements.

The first lens element with negative refractive power has an object-side surface being concave in a paraxial region thereof. Therefore, it is favorable for minimizing the size of the photographing optical lens assembly by reducing an optical effective radius of the first lens element. The object-side surface of the first lens element can include at least one convex shape in an off-axis region thereof, so that it is favorable for retrieving light from a large field of view, thus the field of view of the photographing optical lens assembly can be enlarged. Furthermore, the object-side surface of the first lens element can include at least one convex critical point in the off-axis region thereof. Therefore, having the critical point in the off-axis region is favorable for correcting aberrations of the peripheral image by adjusting the light path in the off-axis region.

The third lens element can have positive refractive power, the fourth lens element can have negative refractive power, the fifth lens element can have positive refractive power, and the sixth lens element can have negative refractive power. Therefore, it is favorable for correcting aberrations, especially for correcting aberrations of the peripheral image by balancing the refractive power of each lens element of the photographing optical lens assembly.

The fifth lens element has an object-side surface being concave in a paraxial region thereof and an image-side surface being convex in a paraxial region thereof. Therefore, it is favorable for eliminating aberrations like astigmatism by the meniscus configuration of the lens element.

The sixth lens element can have an object-side surface being convex in a paraxial region thereof, and has an image-side surface being concave in a paraxial region thereof and including at least one convex shape in an off-axis region thereof. Therefore, it is favorable for correcting aberrations of the photographing optical lens assembly, and for positioning the principal point of toward the object side with the image-side surface being concave so as to shorten the back focal length of the photographing optical lens assembly.

When a curvature radius of the object-side surface of the first lens element is R1, and a curvature radius of an image-side surface of the first lens element is R2, the following condition is satisfied: $(R1+R2)/(R1-R2)<0.40$. Therefore, it is favorable for moderating the central curvature of the object-side surface of the first lens element, so as to avoid the first lens element from being overly convex to affect the total track length of the photographing optical lens assembly, while enhancing the lens manufacturability. Moreover, the following condition can be satisfied: $-2.75<(R1+R2)/(R1-R2)\leq 0$. Moreover, the following condition can be satisfied: $-1.40<(R1+R2)/(R1-R2)<-0.30$.

When an Abbe number of the second lens element is V2, an Abbe number of the fourth lens element is V4, and an Abbe number of the sixth lens element is V6, the following condition is satisfied: $10<V2+V4+V6<85$. Therefore, it is favorable for balancing between chromatic aberration and astigmatism. Moreover, the following condition can be satisfied: $30<V2+V4+V6<75$.

When a total number of lens elements having Abbe numbers less than 32 is V32, the following condition is satisfied: $3\leq V32$. Therefore, it is favorable for further balancing the chromatic aberration and astigmatism of the system.

When a curvature radius of an object-side surface of the second lens element is R3, and a curvature radius of an image-side surface of the second lens element is R4, the following condition is satisfied: $|R3/R4|<2.0$. Therefore, it is favorable for obtaining the suitable mechanism and optical system between the first lens element and the second lens element. Moreover, the following condition can be satisfied: $|R3/R4|<1.0$.

When a focal length of the first lens element is f1, and a focal length of the sixth lens element is f6, the following condition is satisfied: $0.50<f1/f6<4.0$. Therefore, it is favorable for obtaining proper refractive power of the rear lens element of the photographing optical lens assembly so as to shorten the back focal length and enhance the peripheral image correction. Thus, the compact size of the photographing optical lens assembly can be achieved.

When the focal length of the first lens element is f1, a focal length of the second lens element is f2, a focal length of the third lens element is f3, a focal length of the fourth lens element is f4, a focal length of the fifth lens element is f5, and the focal length of the sixth lens element is f6, it is favorable for enhancing the correction of the peripheral image by configuring the second lens element with weaker refractive power, so that the third lens element, the fourth lens element, the fifth lens element and the sixth lens element can be arranged with stronger refractive power. Moreover, the following conditions are satisfied: $1.0<|f2/f1|$; $1.0<|f2/f3|$; $1.0<|f2/f4|$; $1.0<|f2/f5|$; $1.0<|f2/f6|$; and $-0.60<f1/f2$. Therefore, it is favorable for distributing the refractive power of the lens elements on the object side.

When a maximum optical effective radius of the object-side surface of the first lens element is Y11, and a maximum optical effective radius of the image-side surface of the sixth lens element is Y62, the following condition is satisfied: $0.50<Y11/Y62<1.50$. Therefore, it is favorable for reducing the total track length of the photographing optical lens assembly so as to maintain the compact size of the photographing optical lens assembly. Moreover, the following condition can be satisfied: $0.65<Y11/Y62<1.30$.

A minimum value among absolute values of the curvature radii of the surfaces of each lens element of the photographing optical lens assembly is an absolute value of a curvature radius of the image-side surface of the sixth lens element. Therefore, it is favorable for shortening the back focal length of the photographing optical lens assembly so as to obtain the compact size of the photographing optical lens assembly.

When a curvature radius of an object-side surface of the third lens element is R5, and a curvature radius of an image-side surface of the third lens element is R6, the following condition is satisfied: $0<(R5+R6)/(R5-R6)<2.0$. Therefore, it is favorable for correcting aberrations generated from the third lens element so as to enhance the image quality.

When the maximum optical effective radius of the object-side surface of the first lens element is Y11, and an entrance pupil diameter of the photographing optical lens assembly is EPD, the following condition is satisfied: $2.0<Y11/EPD<7.0$. Therefore, it is favorable for balancing between a large aperture and the compact size of the photographing optical lens assembly.

When an f-number of the photographing optical lens assembly is Fno, the following condition is satisfied: $1.0<Fno<3.0$. Therefore, it is favorable for providing sufficient incident light so as to obtain better image quality for applications such as nighttime photography. Moreover, the following condition can be satisfied: $1.20<Fno<2.45$.

When a maximum field of view of the photographing optical lens assembly is FOV, the following condition is satisfied: 120 degrees<FOV. Therefore, it is favorable for providing a sufficiently large field of view for the photographing optical lens assembly.

When an axial distance between the object-side surface of the first lens element and an image surface is TL, and a maximum image height of the photographing optical lens assembly is ImgH, the following condition is satisfied: $1.0<TL/ImgH<2.2$. Therefore, it is favorable for reducing the total track length of the photographing optical lens assembly so as to obtain the compact size of the photographing optical lens assembly. Moreover, the following condition can be satisfied: $1.2<TL/ImgH<2.0$.

When a central thickness of the first lens element is CT1, a central thickness of the second lens element is CT2, a central thickness of the third lens element is CT3, a central thickness of the fourth lens element is CT4, a central thickness of the fifth lens element is CT5, and a central thickness of the sixth lens element is CT6, the following conditions are satisfied: $CT4/CT1<1.0$; $CT4/CT2<1.0$; $CT4/CT3<1.0$; $CT4/CT5<1.0$; and $CT4/CT6<1.0$. Therefore, it is favorable for enhancing the aberration correction capability of the fourth lens element by arranging the third lens element and the fifth lens element with strong positive refractive power.

When the curvature radius of the object-side surface of the first lens element is R1, and the maximum image height of the photographing optical lens assembly is ImgH, the following condition is satisfied: $-3.0<R1/ImgH<0$. Therefore, it is favorable for increasing the angle of view of the photographing optical lens assembly by the first lens element retrieving the light from the larger field of view. Moreover, the following condition can be satisfied: $-1.5<R1/ImgH<0$.

When the Abbe number of the sixth lens element is V6, and a refractive index of the sixth lens element is N6, the following condition is satisfied: $5<V6/N6<30$. Therefore, it is favorable for obtaining a proper balance between chromatic aberration and astigmatism.

Each of the aforementioned features of the photographing optical lens assembly can be utilized in various combinations for achieving the corresponding effects.

According to the photographing optical lens assembly of the present disclosure, the lens elements thereof can be made of glass or plastic materials. When the lens elements are made of glass materials, the distribution of the refractive power of the photographing optical lens assembly may be more flexible to design. The glass lens element can either be made by grinding or molding. When the lens elements are made of plastic materials, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the photographing optical lens assembly. Therefore, the total track length of the photographing optical lens assembly can also be reduced.

According to the photographing optical lens assembly of the present disclosure, an additive can be selectively added to any (or more) lens element material to change the transmittance of the lens element for a specific wavelength of light, thereby reducing stray light and color shift. For example, the additive with ability of filtering out the light in 600 nm to 800 nm band in the system can be used to reduce excess red light or infrared light, and the additive with ability of filtering out the light in 350 nm to 450 nm band in the system can be used to reduce excess blue light or ultraviolet light. Therefore, the additives can prevent imaging interference in certain bands of light. In addition, the additive can be uniformly mixed into the plastic and formed into a lens element by injection molding techniques.

According to the photographing optical lens assembly of the present disclosure, when a surface of a lens element is aspheric, it indicates that the complete optical effective area or a partial of the optical effective area of the surface of the lens element can be aspheric.

According to the photographing optical lens assembly of the present disclosure, each of an object-side surface and an image-side surface has a paraxial region and an off-axis region. The paraxial region refers to the region of the surface where light rays travel close to an optical axis, and the off-axis region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. According to the photographing optical lens assembly of the present disclosure, the refractive power or the focal length of a lens element being positive or negative may refer to the refractive power or the focal length in a paraxial region of the lens element.

According to the photographing optical lens assembly of the present disclosure, the image surface of the photographing optical lens assembly, based on the corresponding image sensor, can be flat or curved. In particular, the image surface can be a concave curved surface facing towards the object side. According to the photographing optical lens assembly of the present disclosure, at least one image correcting element (such as a field flattener) can be selectively disposed between the lens element closest to the image side of the photographing optical lens assembly and the image surface so as to correct the image (such as the field curvature). Properties of the image correcting element, such as curvature, thickness, refractive index, position, surface shape (convex/concave, spherical/aspheric/diffractive/Fresnel etc.) can be adjusted according to the requirements of the imaging apparatus. In general, the image correcting element is preferably a thin plano-concave element having a concave surface toward the object side and is disposed close to the image surface.

According to the photographing optical lens assembly of the present disclosure, the photographing optical lens assembly can include at least one stop, such as an aperture stop, a glare stop or a field stop. Said glare stop or said field stop is for eliminating the stray light and thereby improving the image resolution thereof.

According to the photographing optical lens assembly of the present disclosure, an aperture stop can be configured as a front stop or a middle stop. A front stop disposed between an object and the first lens element can provide a longer distance between an exit pupil of the photographing optical lens assembly and the image surface, and thereby obtains a telecentric effect and improves the image-sensing efficiency of the image sensor, such as CCD or CMOS. A middle stop disposed between the first lens element and the image surface is favorable for enlarging the field of view of the photographing optical lens assembly and thereby provides a wider field of view for the same.

According to the photographing optical lens assembly of the present disclosure, an aperture control unit can be properly configured. The aperture control unit can be a mechanical element or a light controlling element, and the dimension and the shape of the aperture control unit can be electrically controlled. The mechanical element can include a moveable component such a blade group or a shielding plate. The light controlling element can include a screen component such as a light filter, an electrochromic material, a liquid crystal layer or the like. The amount of incoming light or the exposure time of the image can be controlled by the aperture control unit to enhance the image moderation ability. In addition, the aperture control unit can be the aperture stop of the photographing optical lens assembly according to the present disclosure, so as to moderate the image quality by changing f-number such as changing the depth of field or the exposure speed.

According to the photographing optical lens assembly of the present disclosure, the photographing optical lens assembly can be applied to 3D (three-dimensional) image capturing applications, in products such as digital cameras, mobile devices, digital tablets, smart TVs, surveillance systems, motion sensing input devices, driving recording systems, rearview camera systems, wearable devices, unmanned aerial vehicles, and other electronic products.

According to the present disclosure, an imaging apparatus is provided. The imaging apparatus includes the aforementioned photographing optical lens assembly and an image sensor, wherein the image sensor is disposed on the image side of the aforementioned photographing optical lens assembly, that is, the image sensor can be disposed on or near the image surface of the aforementioned photographing optical lens assembly. Therefore, it is favorable for obtaining sufficient refractive power by the arrangement of the first lens element with negative refractive power and the second lens element with negative power of the photographing optical lens assembly, so as to control the light path and obtain the compactness of the photographing optical lens assembly. Moreover, the imaging apparatus can further include a barrel member, a holder member or a combination thereof.

According to the present disclosure, an electronic device is provided, which includes the aforementioned imaging apparatus. The imaging apparatus includes the photographing optical lens assembly and an image sensor, wherein the image sensor is disposed on the image surface of the photographing optical lens assembly. Moreover, the electronic device can further include but not limited to a control unit, a display, a storage unit, a random access memory unit (RAM) or a combination thereof.

According to the above description of the present disclosure, the following 1st-11th specific embodiments are provided for further explanation.

1st Embodiment

Figure 2:
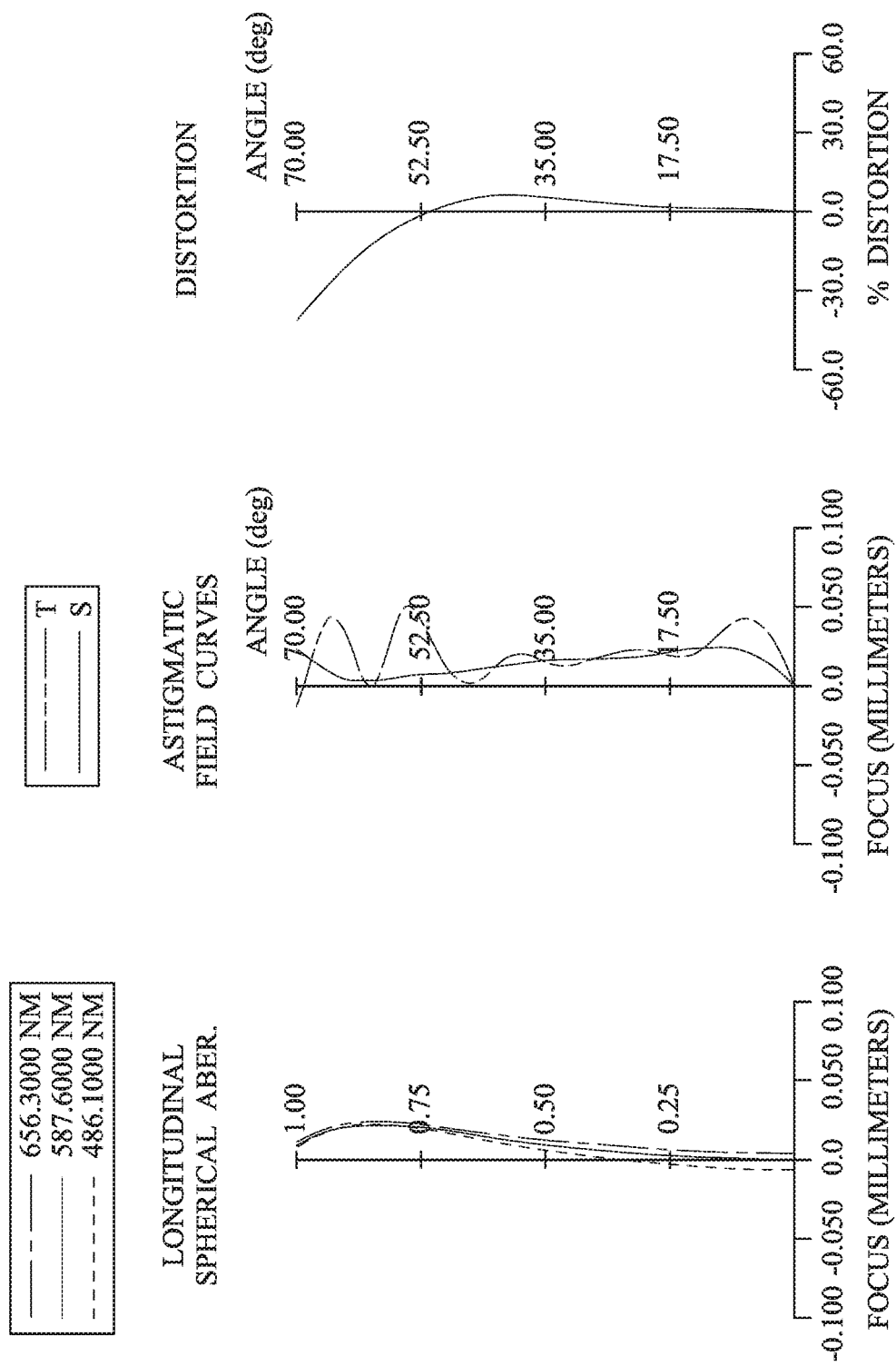
FIG. 2 shows spherical aberration curves, astigmatic field curves and a distortion curve of the image apparatus according to the 1st embodiment.

FIG. 1 is a schematic view of an image apparatus according to the 1st embodiment of the present disclosure. FIG. 2 shows spherical aberration curves, astigmatic field curves and a distortion curve of the image apparatus according to the 1st embodiment. In FIG. 1, the imaging apparatus includes a photographing optical lens assembly (its reference numeral is omitted) and an image sensor 190. The photographing optical lens assembly includes, in order from an object side to an image side, a first lens element 110, a second lens element 120, an aperture stop 100, a third lens element 130, a fourth lens element 140, a fifth lens element 150, a sixth lens element 160, an IR-cut filter 170, and an image surface 180, wherein the image sensor 190 is disposed on the image surface 180 of the photographing optical lens assembly. The photographing optical lens assembly includes six lens elements (110, 120, 130, 140, 150, 160) without additional one or more lens elements inserted between the first lens element 110 and the sixth lens element 160.

The first lens element 110 with negative refractive power has an object-side surface 111 being concave in a paraxial region thereof and an image-side surface 112 being concave in a paraxial region thereof. The first lens element 110 is made of a plastic material, and has the object-side surface 111 and the image-side surface 112 being both spherical. Furthermore, the object-side surface 111 of the first lens element 110 includes at least one convex shape in an off-axis region thereof and at least one convex critical point in the off-axis region thereof.

The second lens element 120 with negative refractive power has an object-side surface 121 being convex in a paraxial region thereof and an image-side surface 122 being concave in a paraxial region thereof. The second lens element 120 is made of a plastic material, and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of a plastic material, and has the object-side surface 131 and the image-side surface 132 being both aspheric.

The fourth lens element 140 with negative refractive power has an object-side surface 141 being convex in a paraxial region thereof and an image-side surface 142 being concave in a paraxial region thereof. The fourth lens element 140 is made of a plastic material, and has the object-side surface 141 and the image-side surface 142 being both aspheric.

The fifth lens element 150 with positive refractive power has an object-side surface 151 being concave in a paraxial region thereof and an image-side surface 152 being convex in a paraxial region thereof. The fifth lens element 150 is made of a plastic material, and has the object-side surface 151 and the image-side surface 152 being both aspheric.

The sixth lens element 160 with negative refractive power has an object-side surface 161 being convex in a paraxial region thereof and an image-side surface 162 being concave in a paraxial region thereof. The sixth lens element 160 is made of a plastic material, and has the object-side surface 161 and the image-side surface 162 being both aspheric. Furthermore, the image-side surface 162 of the sixth lens element 160 includes at least one convex shape in an off-axis region thereof.

The IR-cut filter 170 is made of glass and located between the sixth lens element 160 and the image plane 180, and will not affect the focal length of the photographing optical lens assembly.

The equation of the aspheric surface profiles of the aforementioned lens elements of the 1st embodiment is expressed as follows:

$$X(Y) = (Y^2/R)/(1 + \mathrm{sqrt}(1 - (1+k) \times (Y/R)^2)) + \sum_i (Ai) \times (Y^i),$$

where
X is the relative distance between a point on the aspheric surface spaced at a distance Y from the optical axis and the tangential plane at the aspheric surface vertex on the optical axis;
Y is the vertical distance from the point on the aspheric surface to the optical axis;
R is the curvature radius;
k is the conic coefficient; and
Ai is the i-th aspheric coefficient.

In the photographing optical lens assembly according to the 1st embodiment, when a focal length of the photographing optical lens assembly is f, an f-number of the photographing optical lens assembly is Fno, and half of a maximum field of view of the photographing optical lens assembly is HFOV, these parameters have the following values: f=1.84 mm; Fno=2.65; and HFOV=70.0 degrees.

In the photographing optical lens assembly according to the 1st embodiment, when a maximum field of view of the photographing optical lens assembly is FOV, the following condition is satisfied: FOV=140.0 degrees.

In the photographing optical lens assembly according to the 1st embodiment, when a total number of lens elements having Abbe numbers less than 32 is V32, the following condition is satisfied: V32=3.

In the photographing optical lens assembly according to the 1st embodiment, when an Abbe number of the second lens element 120 is V2, an Abbe number of the fourth lens element 140 is V4, an Abbe number of the sixth lens element 160 is V6, and a refractive index of the sixth lens element 160 is N6, the following conditions are satisfied: V2+V4+V6=61.3; and V6/N6=14.34.

In the photographing optical lens assembly according to the 1st embodiment, when a curvature radius of the object-side surface 111 of the first lens element 110 is R1, and a curvature radius of the image-side surface 112 of the first lens element 110 is R2, the following condition is satisfied: (R1+R2)/(R1−R2)=−0.34.

In the photographing optical lens assembly according to the 1st embodiment, when a curvature radius of the object-side surface 121 of the second lens element 120 is R3, and a curvature radius of the image-side surface 122 of the second lens element 120 is R4, the following condition is satisfied: |R3/R4|=1.15.

In the photographing optical lens assembly according to the 1st embodiment, when a curvature radius of the object-side surface 131 of the third lens element 130 is R5, and a curvature radius of the image-side surface 132 of the third lens element 130 is R6, the following condition is satisfied: (R5+R6)/(R5−R6)=0.50.

In the photographing optical lens assembly according to the 1st embodiment, when the curvature radius of the object-side surface 111 of the first lens element 110 is R1, and a maximum image height of the photographing optical lens assembly is ImgH, the following condition is satisfied: R1/ImgH=−1.21.

In the photographing optical lens assembly according to the 1st embodiment, when a central thickness of the first lens element 110 is CT1, a central thickness of the second lens element 120 is CT2, a central thickness of the third lens element 130 is CT3, a central thickness of the fourth lens element 140 is CT4, a central thickness of the fifth lens element 150 is CT5, and a central thickness of the sixth lens element 160 is CT6, the following conditions are satisfied: CT4/CT1=0.23; CT4/CT2=0.50; CT4/CT3=0.36; CT4/CT5=0.31; and CT4/CT6=0.75.

In the photographing optical lens assembly according to the 1st embodiment, when an axial distance between the object-side surface 111 of the first lens element 110 and the image surface 180 is TL, and the maximum image height of the photographing optical lens assembly is ImgH, the following condition is satisfied: TL/ImgH=1.98.

In the photographing optical lens assembly according to the 1st embodiment, when a focal length of the first lens element 110 is f1, a focal length of the second lens element 120 is f2, a focal length of the third lens element 130 is f3, a focal length of the fourth lens element 140 is f4, a focal length of the fifth lens element 150 is f5, and a focal length of the sixth lens element 160 is f6, the following conditions are satisfied: f1/f2=0.07; f1/f6=2.04; |f2/f1|=14.36; |f2/f3|=38.70; |f2/f4|=9.38; |f2/f5|=32.63; and |f2/f6|=29.35.

Figure 15B:
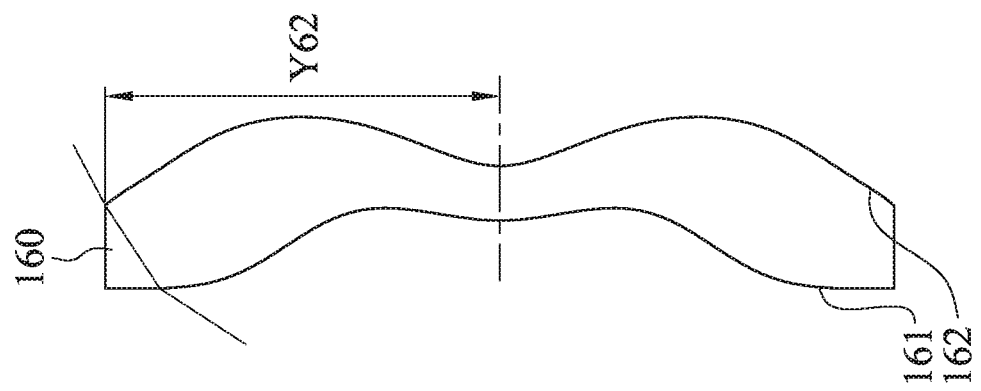
FIG. 15B shows a parameter Y62 of the photographing optical lens assembly according to the 1st embodiment of the present disclosure of FIG. 1.
Figure 15A:
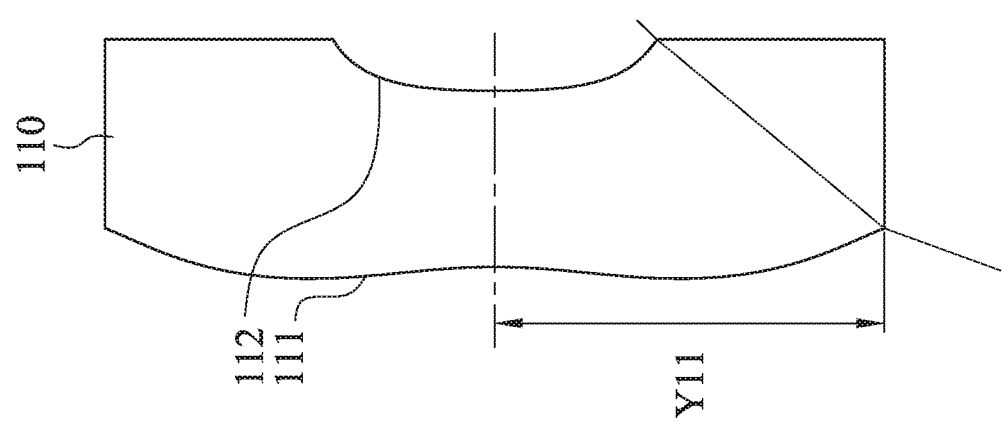
FIG. 15A shows a parameter Y11 of the photographing optical lens assembly according to the 1st embodiment of the present disclosure of FIG. 1.

FIG. 15A shows a parameter Y11 of the photographing optical lens assembly according to the 1st embodiment of the present disclosure of FIG. 1.

FIG. 15B shows a parameter Y62 of the photographing optical lens assembly according to the 1st embodiment of the present disclosure of FIG. 1. In the photographing optical lens assembly according to the 1st embodiment, when a maximum optical effective radius of the object-side surface 111 of the first lens element 110 is Y11, a maximum optical effective radius of the image-side surface 162 of the sixth lens element 160 is Y62, and an entrance pupil diameter of the photographing optical lens assembly is EPD, the following conditions are satisfied: Y11/Y62=0.99; and Y11/EPD=3.49.

The detailed optical data of the 1st embodiment are shown in Table 1 and the aspheric surface data are shown in Table 2 below.

TABLE 1

1st Embodiment
f = 1.84 mm, Fno = 2.65, HFOV = 70.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.620 | ASP | 1.098 | Plastic | 1.545 | 56.1 | −4.29 |
| 2 | | 7.283 | ASP | 0.318 | | | | |
| 3 | Lens 2 | 3.220 | ASP | 0.510 | Plastic | 1.680 | 18.4 | −61.55 |
| 4 | | 2.798 | ASP | 0.222 | | | | |
| 5 | Ape. Stop | Plano | | −0.017 | | | | |
| 6 | Lens 3 | 3.262 | ASP | 0.713 | Plastic | 1.544 | 56.0 | 1.59 |
| 7 | | −1.087 | ASP | 0.171 | | | | |
| 8 | Lens 4 | 2.855 | ASP | 0.254 | Plastic | 1.669 | 19.5 | −6.56 |
| 9 | | 1.668 | ASP | 0.579 | | | | |
| 10 | Lens 5 | −2.317 | ASP | 0.819 | Plastic | 1.544 | 56.0 | 1.89 |
| 11 | | −0.800 | ASP | 0.030 | | | | |
| 12 | Lens 6 | 1.229 | ASP | 0.340 | Plastic | 1.639 | 23.5 | −2.10 |
| 13 | | 0.572 | ASP | 0.500 | | | | |
| 14 | IR-cut filter | Plano | | 0.210 | Glass | 1.517 | 64.2 | — |
| 15 | | Plano | | 0.173 | | | | |
| 16 | Image | Plano | | — | | | | |

Reference wavelength is 587.6 nm (d-line).
Effective radius of Surface 10 is 1.410 mm.

TABLE 2

Aspheric Coefficients

| Surface # | 1 | 2 | 3 | 4 | 6 | 7 |
|---|---|---|---|---|---|---|
| k= | 4.9821E−01 | 2.4240E+01 | −2.0683E+00 | −3.1600E+01 | 1.3559E+01 | 5.2053E−01 |
| A4= | 9.9458E−02 | 1.4927E−01 | −2.7713E−02 | 1.8690E−01 | −1.2052E−01 | −1.6678E−01 |
| A6= | −3.7191E−02 | 7.5844E−02 | 1.0850E−01 | 1.1751E−01 | −2.1990E−01 | 5.9200E−01 |
| A8= | 1.2887E−02 | −1.5272E−01 | −1.5470E−01 | −8.6069E−01 | −5.1475E−01 | 2.6881E−01 |
| A10= | −3.1683E−03 | 2.1854E−01 | 8.1563E−02 | 1.8211E+00 | −1.3999E+00 | −1.4582E+01 |
| A12= | 5.0628E−04 | −1.0869E−01 | | | | 5.8165E+01 |
| A14= | −4.6046E−05 | 4.4443E−02 | | | | −1.0198E+02 |
| A16= | 1.7673E−06 | | | | | 6.5952E+01 |

| Surface # | 8 | 9 | 10 | 11 | 12 | 13 |
|---|---|---|---|---|---|---|
| k= | −7.6886E+00 | −1.9114E+00 | 1.3617E+00 | −1.4447E+00 | −2.1097E+01 | −4.9530E+00 |
| A4= | −5.2033E−01 | −3.7429E−01 | 1.6621E−01 | 3.5366E−01 | −3.8368E−02 | −1.0908E−01 |
| A6= | 1.0517E+00 | 6.7958E−01 | −2.5935E−01 | −5.8879E−01 | −2.5208E−01 | 6.7285E−03 |
| A8= | −2.2570E+00 | −1.2219E+00 | 3.9635E−01 | 5.2171E−01 | 2.0544E−01 | 1.8646E−02 |
| A10= | 1.9567E+00 | 1.6315E+00 | −4.1784E−01 | −2.5756E−01 | −7.1276E−02 | −9.9453E−03 |
| A12= | 1.4550E+00 | −1.4286E+00 | 2.7854E−01 | 7.1897E−02 | 1.3138E−02 | 2.2190E−03 |
| A14= | −5.0823E+00 | 7.1109E−01 | −9.7248E−02 | −9.7499E−03 | −1.2703E−03 | −2.3016E−04 |
| A16= | 2.9933E+00 | −1.5029E−01 | 1.3616E−02 | 3.9062E−04 | 5.0946E−05 | 9.0544E−06 |

In Table 1, the curvature radius, the thickness and the focal length are shown in millimeters (mm). Surface numbers 0-16 represent the surfaces sequentially arranged from the object side to the image side along the optical axis. In Table 2, k represents the conic coefficient of the equation of the aspheric surface profiles. A4-A14 represent the aspheric coefficients ranging from the 4th order to the 14th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

2nd Embodiment

Figure 3:
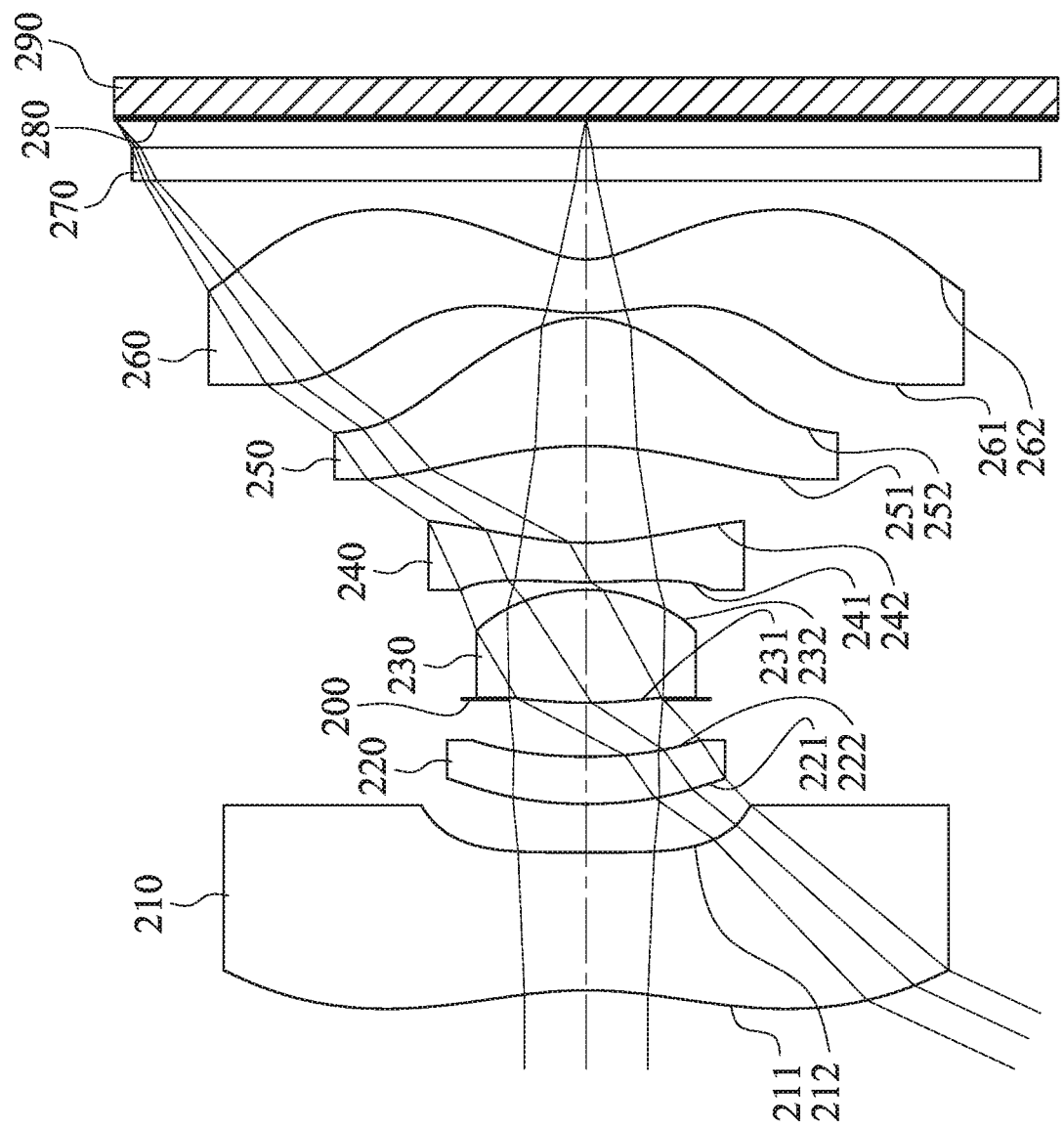
FIG. 3 is a schematic view of an image apparatus according to the 2nd embodiment of the present disclosure.
Figure 4:
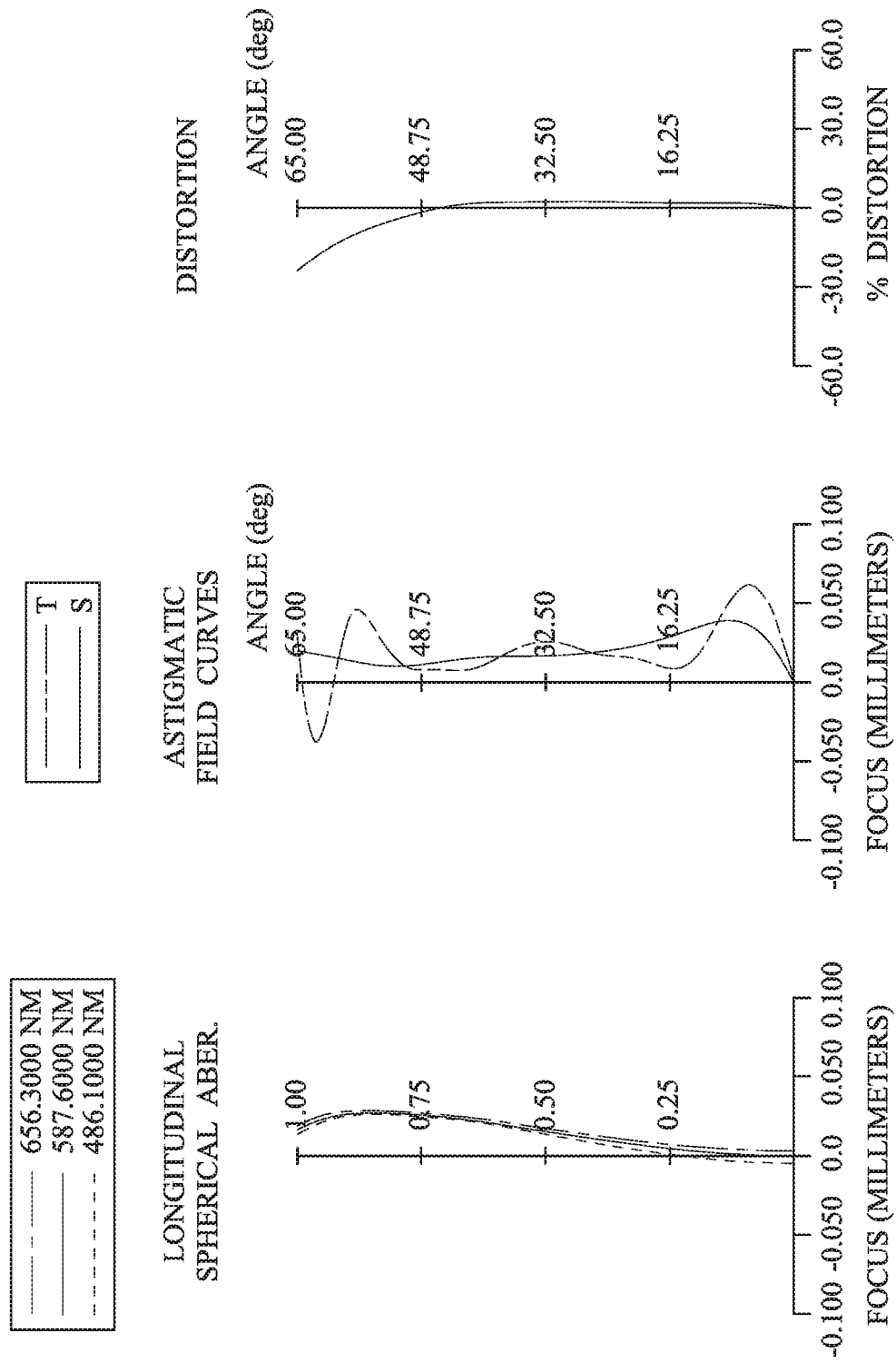
FIG. 4 shows spherical aberration curves, astigmatic field curves and a distortion curve of the image apparatus according to the 2nd embodiment.

FIG. 3 is a schematic view of an image apparatus according to the 2nd embodiment of the present disclosure. FIG. 4 shows spherical aberration curves, astigmatic field curves and a distortion curve of the image apparatus according to the 2nd embodiment. In FIG. 3, the imaging apparatus includes a photographing optical lens assembly (its reference numeral is omitted) and an image sensor 290. The photographing optical lens assembly includes, in order from an object side to an image side, a first lens element 210, a second lens element 220, an aperture stop 200, a third lens element 230, a fourth lens element 240, a fifth lens element 250, a sixth lens element 260, an IR-cut filter 270, and an image surface 280, wherein the image sensor 290 is disposed on the image surface 280 of the photographing optical lens assembly. The photographing optical lens assembly includes six lens elements (210, 220, 230, 240, 250, 260) without additional one or more lens elements inserted between the first lens element 210 and the sixth lens element 260.

The first lens element 210 with negative refractive power has an object-side surface 211 being concave in a paraxial region thereof and an image-side surface 212 being convex in a paraxial region thereof. The first lens element 210 is made of a plastic material, and has the object-side surface 211 and the image-side surface 212 being both spherical. Furthermore, the object-side surface 211 of the first lens element 210 includes at least one convex shape in an off-axis region thereof and at least one convex critical point in the off-axis region thereof.

The second lens element 220 with positive refractive power has an object-side surface 221 being convex in a paraxial region thereof and an image-side surface 222 being concave in a paraxial region thereof. The second lens element 220 is made of a plastic material, and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of a plastic material, and has the object-side surface 231 and the image-side surface 232 being both aspheric.

The fourth lens element 240 with negative refractive power has an object-side surface 241 being convex in a paraxial region thereof and an image-side surface 242 being concave in a paraxial region thereof. The fourth lens element 240 is made of a plastic material, and has the object-side surface 241 and the image-side surface 242 being both aspheric.

The fifth lens element 250 with positive refractive power has an object-side surface 251 being concave in a paraxial region thereof and an image-side surface 252 being convex in a paraxial region thereof. The fifth lens element 250 is made of a plastic material, and has the object-side surface 251 and the image-side surface 252 being both aspheric.

The sixth lens element 260 with negative refractive power has an object-side surface 261 being convex in a paraxial region thereof and an image-side surface 262 being concave in a paraxial region thereof. The sixth lens element 260 is made of a plastic material, and has the object-side surface 261 and the image-side surface 262 being both aspheric. Furthermore, the image-side surface 262 of the sixth lens element 260 includes at least one convex shape in an off-axis region thereof.

The IR-cut filter 270 is made of glass and located between the sixth lens element 260 and the image plane 280, and will not affect the focal length of the photographing optical lens assembly.

The detailed optical data of the 2nd embodiment are shown in Table 3 and the aspheric surface data are shown in Table 4 below.

TABLE 3

2nd Embodiment
f = 1.82 mm, Fno = 2.32, HFOV = 65.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.560 | ASP | 0.877 | Plastic | 1.544 | 56.0 | −4.86 |
| 2 | | −88.329 | ASP | 0.307 | | | | |
| 3 | Lens 2 | 2.535 | ASP | 0.301 | Plastic | 1.680 | 18.4 | 22.87 |
| 4 | | 2.883 | ASP | 0.367 | | | | |
| 5 | Ape. Stop | Plano | | −0.023 | | | | |
| 6 | Lens 3 | 3.276 | ASP | 0.717 | Plastic | 1.544 | 56.0 | 1.63 |
| 7 | | −1.124 | ASP | 0.049 | | | | |
| 8 | Lens 4 | 3.966 | ASP | 0.250 | Plastic | 1.680 | 18.4 | −4.49 |
| 9 | | 1.681 | ASP | 0.616 | | | | |
| 10 | Lens 5 | −2.369 | ASP | 0.815 | Plastic | 1.544 | 56.0 | 1.49 |
| 11 | | −0.676 | ASP | 0.030 | | | | |
| 12 | Lens 6 | 1.361 | ASP | 0.340 | Plastic | 1.582 | 30.2 | −1.63 |
| 13 | | 0.508 | ASP | 0.500 | | | | |
| 14 | IR-cut filter | Plano | | 0.210 | Glass | 1.517 | 64.2 | — |
| 15 | | Plano | | 0.187 | | | | |
| 16 | Image | Plano | | — | | | | |

Reference wavelength is 587.6 nm (d-line).
Effective radius of Surface 10 is 1.390 mm.

TABLE 4

Aspheric Coefficients

| Surface # | 1 | 2 | 3 | 4 | 6 | 7 |
|---|---|---|---|---|---|---|
| k= | −7.9750E−02 | −9.0000E+01 | −5.4669E−01 | −4.4843E+01 | 2.3575E+01 | 1.1082E−01 |
| A4= | 1.3703E−01 | 1.4488E−01 | −3.0275E−02 | 1.9148E−01 | −9.3754E−02 | −2.0388E−01 |
| A6= | −5.6278E−02 | 2.6053E−01 | 2.8305E−01 | 1.1360E−01 | −3.1824E−01 | 2.0903E+00 |
| A8= | 2.1260E−02 | −7.3392E−01 | −4.3159E−01 | −7.3100E−01 | 2.1695E−01 | −1.0596E+01 |
| A10= | −5.6311E−03 | 1.1878E+00 | 1.7620E−01 | 7.1989E−01 | −2.4833E+00 | 3.3593E+01 |
| A12= | 9.6405E−04 | −9.5772E−01 | | | | −6.9516E+01 |
| A14= | −9.3491E−05 | 3.3149E−01 | | | | 7.9045E+01 |
| A16= | 3.8879E−06 | | | | | −3.8315E+01 |

TABLE 4-continued

| Aspheric Coefficients | | | | | | |
|---|---|---|---|---|---|---|
| Surface # | 8 | 9 | 10 | 11 | 12 | 13 |
| k = | −5.8085E−01 | −1.4865E+00 | 1.5222E+00 | −1.6321E+00 | −4.5930E+01 | −5.0384E+00 |
| A4= | −6.0924E−01 | −4.2104E−01 | 1.4602E−01 | 3.6808E−01 | −1.1214E−01 | −1.5285E−01 |
| A6= | 2.0708E+00 | 8.7347E−01 | −2.0040E−01 | −7.0827E−01 | −1.0364E−01 | 8.7878E−02 |
| A8= | −7.0148E+00 | −1.6685E+00 | 3.5395E−01 | 7.0108E−01 | 9.7793E−02 | −3.9413E−02 |
| A10= | 1.5789E+01 | 2.4759E+00 | −3.8121E−01 | −3.6792E−01 | −3.0794E−02 | 1.1568E−02 |
| A12= | −2.2230E+01 | −2.5056E+00 | 2.4531E−01 | 1.1022E−01 | 4.6628E−03 | −2.1030E−03 |
| A14= | 1.6081E+01 | 1.4525E+00 | −8.4315E−02 | −1.8301E−02 | −3.2976E−04 | 2.1266E−04 |
| A16= | −4.4115E+00 | −3.5358E−01 | 1.2002E−02 | 1.3282E−03 | 7.7190E−06 | −8.9904E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f[mm] | 1.82 | CT4/CT3 | 0.35 |
| Fno. | 2.32 | CT4/CT5 | 0.31 |
| HFOV [deg.] | 65.0 | CT4/CT6 | 0.74 |
| FOV [deg.] | 130.0 | TL/ImgH | 1.85 |
| V32 | 3 | f1/f2 | −0.21 |
| V2 + V4 + V6 | 67.0 | f1/f6 | 2.99 |
| V6/N6 | 19.11 | |f2/f1| | 4.70 |
| (R1 + R2)/(R1 − R2) | −1.06 | |f2/f3| | 14.01 |
| |R3/R4| | 0.88 | |f2/f4| | 5.09 |
| (R5 + R6)/(R5 − R6) | 0.49 | |f2/f5| | 15.40 |
| R1/ImgH | −0.85 | |f2/f6| | 14.05 |
| CT4/CT1 | 0.29 | Y11/Y62 | 0.96 |
| CT4/CT2 | 0.83 | Y11/EPD | 2.93 |

3rd Embodiment

Figure 5:
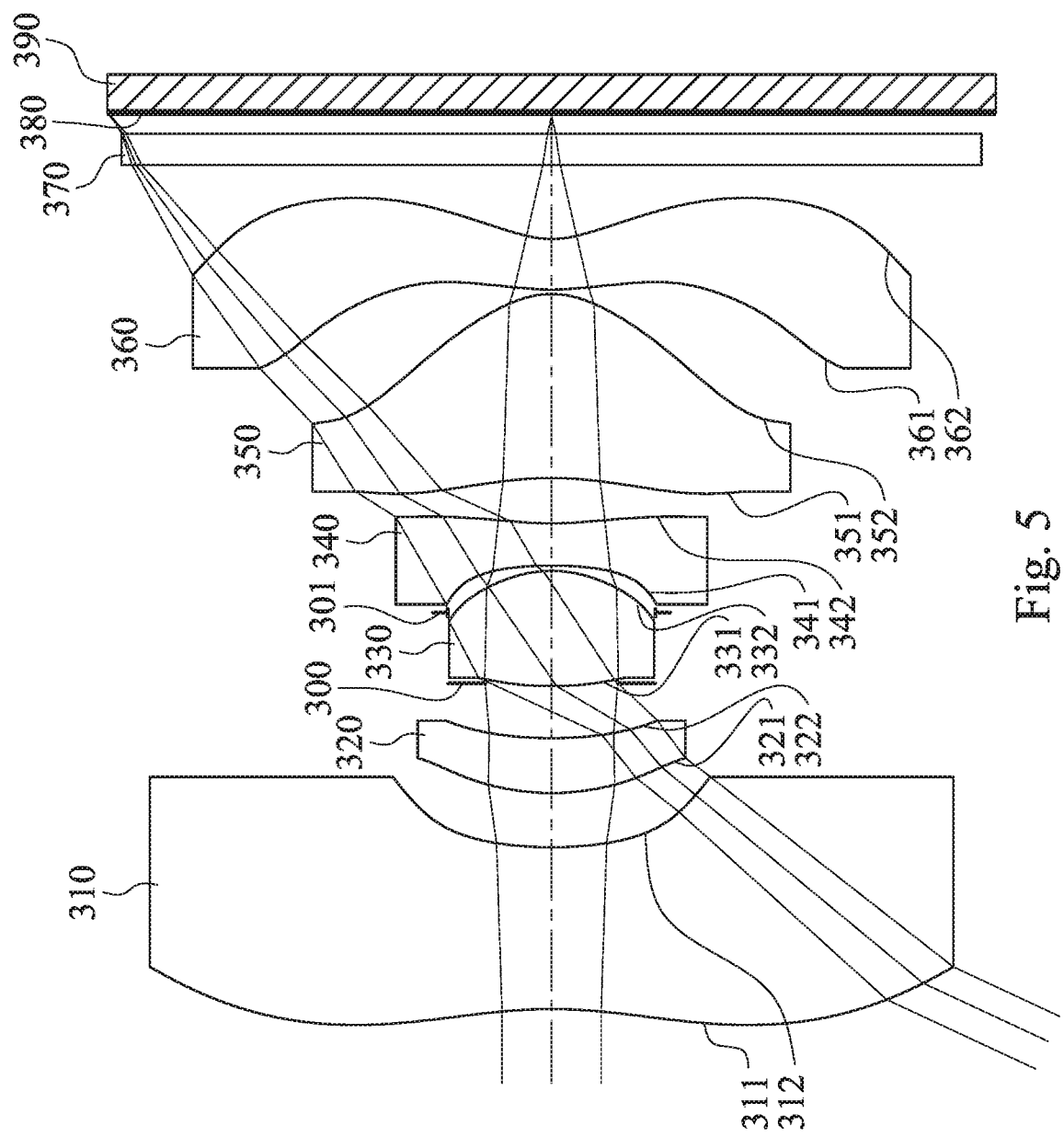
FIG. 5 is a schematic view of an image apparatus according to the 3rd embodiment of the present disclosure.
Figure 6:
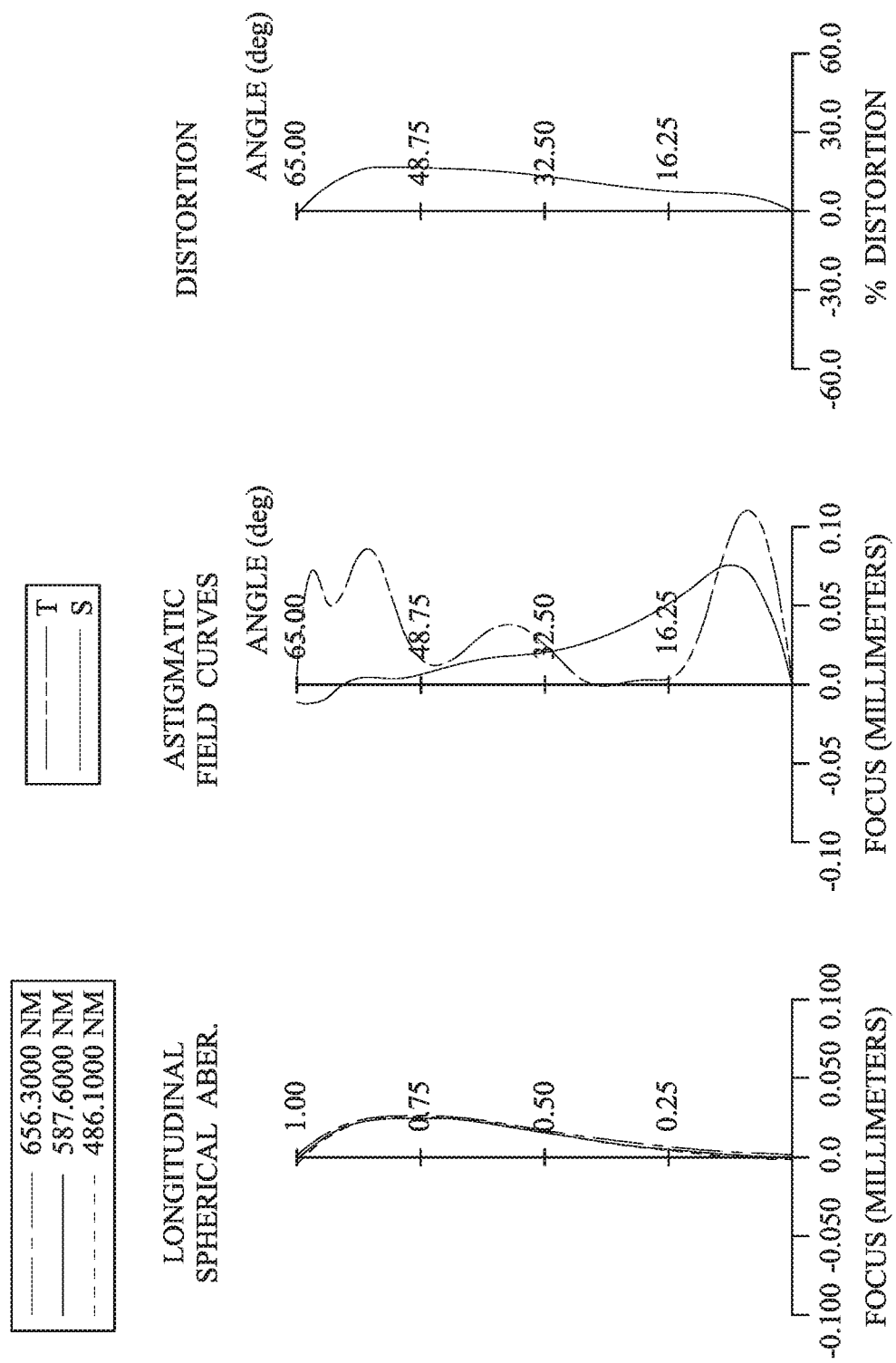
FIG. 6 shows spherical aberration curves, astigmatic field curves and a distortion curve of the image apparatus according to the 3rd embodiment.

FIG. 5 is a schematic view of an image apparatus according to the 3rd embodiment of the present disclosure. FIG. 6 shows spherical aberration curves, astigmatic field curves and a distortion curve of the image apparatus according to the 3rd embodiment. In FIG. 5, the imaging apparatus includes a photographing optical lens assembly (its reference numeral is omitted) and an image sensor 390. The photographing optical lens assembly includes, in order from an object side to an image side, a first lens element 310, a second lens element 320, an aperture stop 300, a third lens element 330, a fourth lens element 340, a fifth lens element 350, a sixth lens element 360, an IR-cut filter 370, and an image surface 380, wherein the image sensor 390 is disposed on the image surface 380 of the photographing optical lens assembly. The photographing optical lens assembly includes six lens elements (310, 320, 330, 340, 350, 360) without additional one or more lens elements inserted between the first lens element 310 and the sixth lens element 360.

The first lens element 310 with negative refractive power has an object-side surface 311 being concave in a paraxial region thereof and an image-side surface 312 being concave in a paraxial region thereof. The first lens element 310 is made of a plastic material, and has the object-side surface 311 and the image-side surface 312 being both spherical. Furthermore, the object-side surface 311 of the first lens element 310 includes at least one convex shape in an off-axis region thereof and at least one convex critical point in the off-axis region thereof.

The second lens element 320 with positive refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of a plastic material, and has the object-side surface 331 and the image-side surface 332 being both aspheric.

The fourth lens element 340 with negative refractive power has an object-side surface 341 being concave in a paraxial region thereof and an image-side surface 342 being concave in a paraxial region thereof. The fourth lens element 340 is made of a plastic material, and has the object-side surface 341 and the image-side surface 342 being both aspheric.

The fifth lens element 350 with positive refractive power has an object-side surface 351 being concave in a paraxial region thereof and an image-side surface 352 being convex in a paraxial region thereof. The fifth lens element 350 is made of a plastic material, and has the object-side surface 351 and the image-side surface 352 being both aspheric.

The sixth lens element 360 with negative refractive power has an object-side surface 361 being convex in a paraxial region thereof and an image-side surface 362 being concave in a paraxial region thereof. The sixth lens element 360 is made of a plastic material, and has the object-side surface 361 and the image-side surface 362 being both aspheric. Furthermore, the image-side surface 362 of the sixth lens element 360 includes at least one convex shape in an off-axis region thereof.

The IR-cut filter 370 is made of glass and located between the sixth lens element 360 and the image plane 380, and will not affect the focal length of the photographing optical lens assembly.

The detailed optical data of the 3rd embodiment are shown in Table 5 and the aspheric surface data are shown in Table 6 below.

TABLE 5

3rd Embodiment
f = 1.40 mm, Fno = 2.10, HFOV = 65.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.168 | ASP | 1.091 | Plastic | 1.544 | 56.0 | −2.37 |
| 2 | | 2.444 | ASP | 0.366 | | | | |
| 3 | Lens 2 | 1.545 | ASP | 0.370 | Plastic | 1.639 | 23.5 | 5.36 |
| 4 | | 2.552 | ASP | 0.371 | | | | |
| 5 | Ape. Stop | Plano | | −0.020 | | | | |
| 6 | Lens 3 | 2.181 | ASP | 0.777 | Plastic | 1.544 | 56.0 | 1.20 |
| 7 | | −0.817 | ASP | −0.282 | | | | |
| 8 | Stop | Plano | | 0.317 | | | | |
| 9 | Lens 4 | −3.306 | ASP | 0.286 | Plastic | 1.639 | 23.5 | −2.06 |
| 10 | | 2.257 | ASP | 0.306 | | | | |
| 11 | Lens 5 | −2.104 | ASP | 1.241 | Plastic | 1.544 | 56.0 | 1.14 |
| 12 | | −0.577 | ASP | 0.030 | | | | |
| 13 | Lens 6 | 1.446 | ASP | 0.340 | Plastic | 1.639 | 23.5 | −1.74 |
| 14 | | 0.571 | ASP | 0.500 | | | | |
| 15 | IR-cut filter | Plano | | 0.210 | Glass | 1.517 | 64.2 | — |
| 16 | | Plano | | 0.144 | | | | |
| 17 | Image | Plano | | | | | | |

Reference wavelength is 587.6 nm (d-line).
Effective radius of Surface 8 is 0.700 mm.

TABLE 6

Aspheric Coefficients

| Surface # | 1 | 2 | 3 | 4 | 6 | 7 |
|---|---|---|---|---|---|---|
| k = | 1.3456E−01 | −9.9169E+00 | −1.7248E+00 | −9.0000E+01 | 1.1566E+01 | −3.1018E−01 |
| A4= | 9.2447E−02 | 1.9847E−02 | −1.4449E−01 | 4.5459E−01 | −6.8357E−02 | 2.4765E−01 |
| A6= | −2.8821E−02 | 5.8290E−01 | 7.4403E−01 | −6.6096E−01 | −3.8436E−01 | −7.4462E−01 |
| A8= | 8.2367E−03 | −1.0241E+00 | −1.0538E+00 | 6.1809E−01 | 3.0569E−02 | 1.1705E+01 |
| A10= | −1.6522E−03 | 1.2721E+00 | 4.0289E−01 | −1.5530E−01 | −4.4031E+00 | −7.1627E+01 |
| A12= | 2.1521E−04 | −7.8638E−01 | | | | 2.0251E+02 |
| A14= | −1.6057E−05 | 1.6461E−01 | | | | −3.0076E+02 |
| A16= | 5.2364E−07 | | | | | 1.8519E+02 |

| Surface # | 9 | 10 | 11 | 12 | 13 | 14 |
|---|---|---|---|---|---|---|
| k= | 1.5663E+01 | −3.8488E+00 | 8.4455E−01 | −1.5747E+00 | −9.0000E+01 | −7.4188E+00 |
| A4= | −4.4641E−01 | −4.7033E−01 | 3.4111E−01 | 4.5307E−01 | 1.0146E−01 | −7.4077E−02 |
| A6= | −2.1173E+00 | 6.6261E−01 | −6.1277E−01 | −9.9620E−01 | −4.5396E−01 | 7.3167E−03 |
| A8= | 2.8741E+01 | −3.1478E−01 | 9.4339E−01 | 1.1232E+00 | 4.4117E−01 | 6.2222E−03 |
| A10= | −1.5709E+02 | −4.8147E−01 | −7.9955E−01 | −7.1036E−01 | −2.1439E−01 | −2.7344E−03 |
| A12= | 4.5272E+02 | 7.7907E−01 | 3.6828E−01 | 2.6248E−01 | 5.6146E−02 | 4.5885E−04 |
| A14= | −7.0040E+02 | −3.9973E−01 | −8.3368E−02 | −5.2421E−02 | −7.5047E−03 | −3.8420E−05 |
| A16= | 4.4302E+02 | 7.0451E−02 | 6.6378E−03 | 4.3150E−03 | 4.0074E−04 | 1.4735E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

3rd Embodiment

| f [mm] | 1.40 | CT4/CT3 | 0.37 |
|---|---|---|---|
| Fno. | 2.10 | CT4/CT5 | 0.23 |
| HFOV [deg.] | 65.0 | CT4/CT6 | 0.84 |
| FOV [deg.] | 130.0 | TL/ImgH | 2.02 |

-continued

3rd Embodiment

| V32 | 3 | f1/f2 | −0.44 |
|---|---|---|---|
| V2 + V4 + V6 | 70.5 | f1/f6 | 1.36 |
| V6/N6 | 14.34 | |f2/f1| | 2.26 |
| (R1 + R2)/(R1 − R2) | 0.13 | |f2/f3| | 4.46 |
| |R3/R4| | 0.61 | |f2/f4| | 2.60 |
| (R5 + R6)/(R5 − R6) | 0.45 | |f2/f5| | 4.72 |
| R1/ImgH | −1.06 | |f2/f6| | 3.08 |
| CT4/CT1 | 0.26 | Y11/Y62 | 1.12 |
| CT4/CT2 | 0.77 | Y11/EPD | 4.06 |

4th Embodiment

Figure 7:
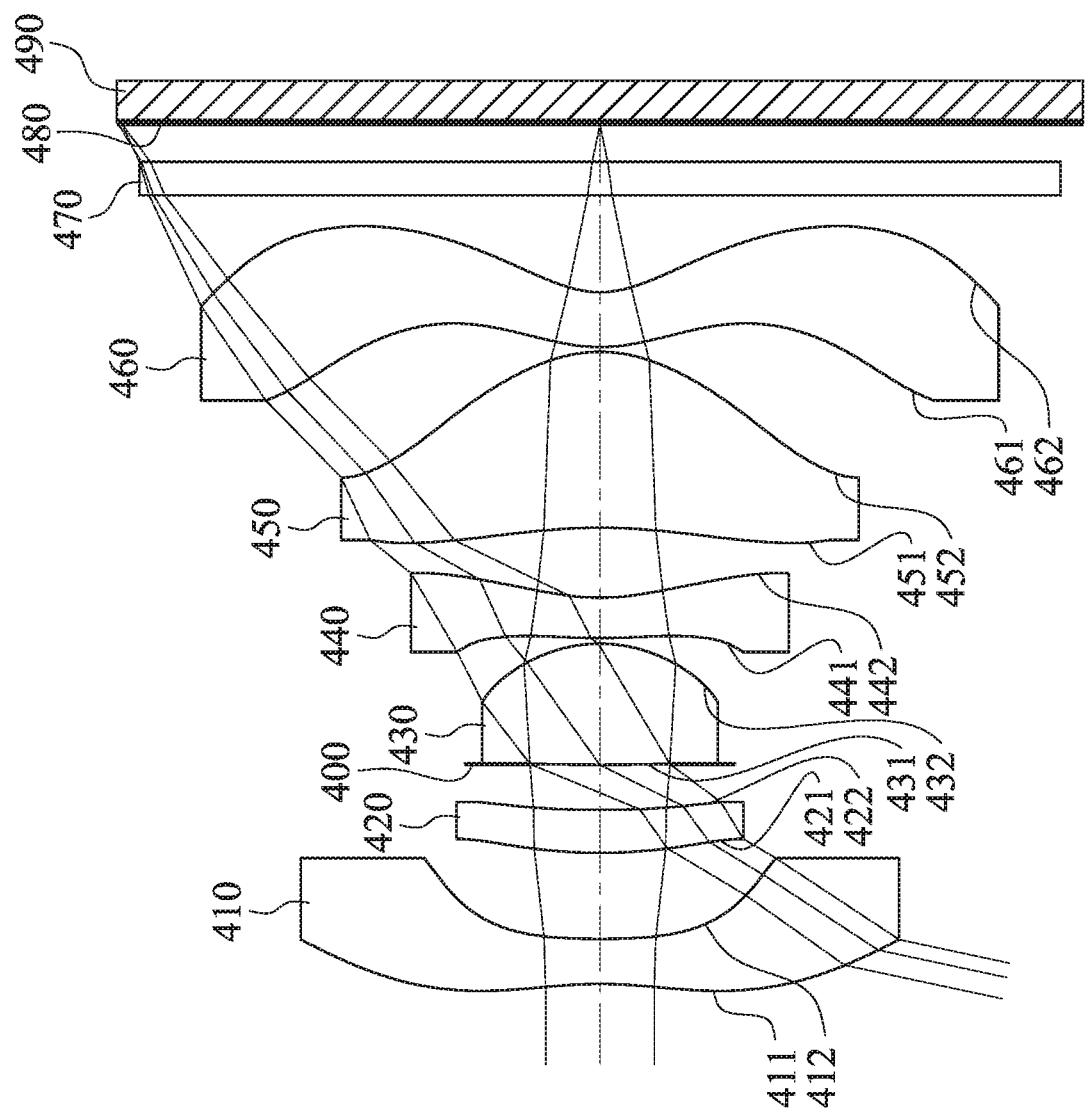
FIG. 7 is a schematic view of an image apparatus according to the 4th embodiment of the present disclosure.
Figure 8:
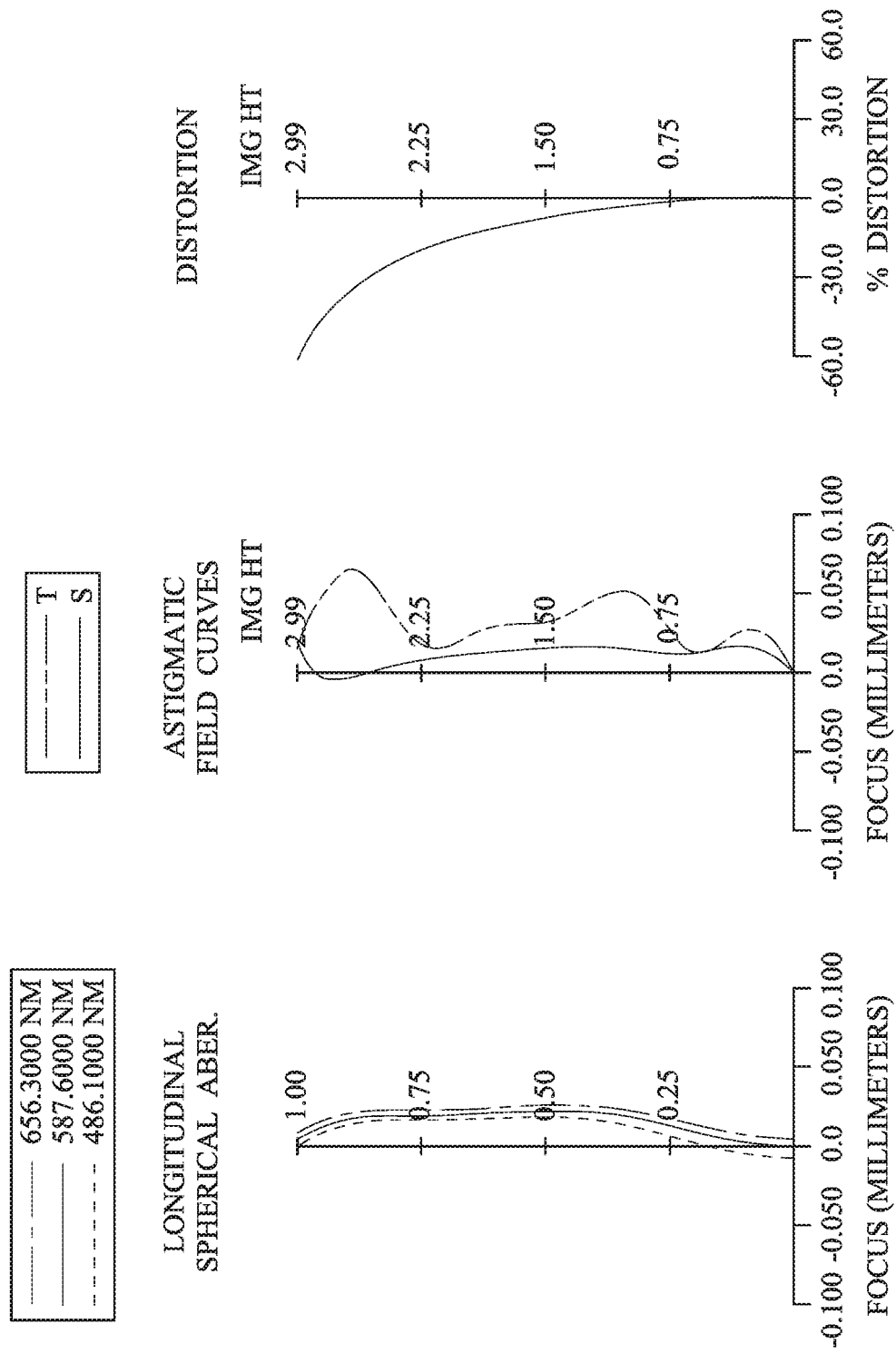
FIG. 8 shows spherical aberration curves, astigmatic field curves and a distortion curve of the image apparatus according to the 4th embodiment.

FIG. 7 is a schematic view of an image apparatus according to the 4th embodiment of the present disclosure. FIG. 8 shows spherical aberration curves, astigmatic field curves and a distortion curve of the image apparatus according to the 4th embodiment. In FIG. 7, the imaging apparatus includes a photographing optical lens assembly (its reference numeral is omitted) and an image sensor 490. The photographing optical lens assembly includes, in order from an object side to an image side, a first lens element 410, a second lens element 420, an aperture stop 400, a third lens element 430, a fourth lens element 440, a fifth lens element 450, a sixth lens element 460, an IR-cut filter 470, and an image surface 480, wherein the image sensor 490 is disposed on the image surface 480 of the photographing optical lens assembly. The photographing optical lens assembly includes six lens elements (410, 420, 430, 440, 450, 460) without additional one or more lens elements inserted between the first lens element 410 and the sixth lens element 460.

The first lens element 410 with negative refractive power has an object-side surface 411 being concave in a paraxial region thereof and an image-side surface 412 being concave in a paraxial region thereof. The first lens element 410 is made of a plastic material, and has the object-side surface 411 and the image-side surface 412 being both spherical. Furthermore, the object-side surface 411 of the first lens element 410 includes at least one convex shape in an off-axis region thereof and at least one convex critical point in the off-axis region thereof.

The second lens element 420 with positive refractive power has an object-side surface 421 being convex in a paraxial region thereof and an image-side surface 422 being concave in a paraxial region thereof. The second lens element 420 is made of a plastic material, and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of a plastic material, and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of a plastic material, and has the object-side surface 441 and the image-side surface 442 being both aspheric.

The fifth lens element 450 with positive refractive power has an object-side surface 451 being concave in a paraxial region thereof and an image-side surface 452 being convex in a paraxial region thereof. The fifth lens element 450 is made of a plastic material, and has the object-side surface 451 and the image-side surface 452 being both aspheric.

The sixth lens element 460 with negative refractive power has an object-side surface 461 being convex in a paraxial region thereof and an image-side surface 462 being concave in a paraxial region thereof. The sixth lens element 460 is made of a plastic material, and has the object-side surface 461 and the image-side surface 462 being both aspheric. Furthermore, the image-side surface 462 of the sixth lens element 460 includes at least one convex shape in an off-axis region thereof.

The IR-cut filter 470 is made of glass and located between the sixth lens element 460 and the image plane 480, and will not affect the focal length of the photographing optical lens assembly.

The detailed optical data of the 4th embodiment are shown in Table 7 and the aspheric surface data are shown in Table 8 below.

TABLE 7

4th Embodiment
f = 1.64 mm, Fno = 2.43, HFOV = 78.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.532 | ASP | 0.280 | Plastic | 1.545 | 56.1 | −3.11 |
| 2 | | 5.326 | ASP | 0.534 | | | | |
| 3 | Lens 2 | 3.130 | ASP | 0.266 | Plastic | 1.669 | 19.4 | 9.22 |
| 4 | | 6.139 | ASP | 0.280 | | | | |
| 5 | Lens 3 | 9.166 | ASP | 0.752 | Plastic | 1.544 | 56.0 | 1.55 |
| 6 | | −0.898 | ASP | 0.035 | | | | |
| 7 | Lens 4 | 3.344 | ASP | 0.250 | Plastic | 1.669 | 19.4 | −3.51 |
| 8 | | 1.338 | ASP | 0.435 | | | | |
| 9 | Lens 5 | −3.058 | ASP | 1.091 | Plastic | 1.544 | 56.0 | 1.89 |
| 10 | | −0.868 | ASP | 0.030 | | | | |
| 11 | Lens 6 | 1.006 | ASP | 0.340 | Plastic | 1.657 | 20.4 | −2.84 |
| 12 | | 0.566 | ASP | 0.600 | | | | |
| 13 | IR-cut filter | Plano | | 0.210 | Glass | 1.517 | 64.2 | — |
| 14 | | Plano | | 0.245 | | | | |
| 15 | Image | Plano | | — | | | | |

Reference wavelength is 587.6 nm (d-line).
The aperture is on the Surface 5.

TABLE 8

Aspheric Coefficients

| Surface # | 1 | 2 | 3 | 4 | 5 | 6 |
|---|---|---|---|---|---|---|
| k= | 5.8735E−01 | −8.9414E+01 | −1.1644E+01 | −7.7102E+01 | −2.0476E+00 | −2.3028E−01 |
| A4= | 3.3760E−01 | 3.2806E−01 | −2.7205E−02 | 7.1257E−02 | −7.1674E−02 | 7.5193E−02 |
| A6= | −2.7338E−01 | 2.3905E−01 | 2.7059E−01 | 9.7925E−02 | −2.4716E−01 | −7.2649E−01 |

TABLE 8-continued

| Aspheric Coefficients | | | | | | |
|---|---|---|---|---|---|---|
| A8= | 1.8221E−01 | −1.1079E+00 | −5.8434E−01 | −4.6462E−01 | −4.4775E−01 | 1.0747E+01 |
| A10= | −8.0369E−02 | 1.7795E+00 | 2.9495E−01 | 3.0882E−01 | −1.0722E+00 | −6.1226E+01 |
| A12= | 2.1852E−02 | −1.1836E+00 | | | | 1.6866E+02 |
| A14= | −3.3044E−03 | 2.6682E−01 | | | | −2.3421E+02 |
| A16 = | 2.1488E−04 | | | | | 1.2877E+02 |

| Surface # | 7 | 8 | 9 | 10 | 11 | 12 |
|---|---|---|---|---|---|---|
| k= | −2.7207E+00 | −2.7421E+00 | 2.3680E+00 | −1.2812E+00 | −7.3768E+00 | −3.3833E+00 |
| A4= | −6.3029E−01 | −5.3210E−01 | 2.1829E−01 | 1.2378E−01 | −1.2517E−01 | −1.8686E−01 |
| A6= | 1.3904E+00 | 1.0719E+00 | −4.1759E−01 | −3.8450E−02 | −5.1318E−02 | 1.1622E−01 |
| A8= | −2.0099E+00 | −1.5641E+00 | 6.3066E−01 | −1.6279E−01 | 8.3601E−02 | −5.0119E−02 |
| A10= | −7.2498E−01 | 1.5270E+00 | −5.3346E−01 | 2.4478E−01 | −4.2511E−02 | 1.3959E−02 |
| A12= | 6.8509E+00 | −9.5023E−01 | 2.5283E−01 | −1.3613E−01 | 1.0983E−02 | −2.3947E−03 |
| A14= | −9.3784E+00 | 3.3858E−01 | −6.2383E−02 | 3.4313E−02 | −1.4244E−03 | 2.2566E−04 |
| A16= | 4.2517E+00 | −5.2709E−02 | 6.2531E−03 | −3.2779E−03 | 7.3473E−05 | −8.8343E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 1.64 | CT4/CT3 | 0.33 |
| Fno. | 2.43 | CT4/CT5 | 0.23 |
| HFOV [deg.] | 78.0 | CT4/CT6 | 0.74 |
| FOV [deg.] | 156.0 | TL/ImgH | 1.79 |
| V32 | 3 | f1/f2 | −0.34 |
| V2 + V4 + V6 | 59.2 | f1/f6 | 1.09 |
| V6/N6 | 12.34 | |f2/f1| | 2.96 |
| (R1 + R2)/(R1 − R2) | −0.36 | |f2/f3| | 5.97 |
| |R3/R4| | 0.51 | |f2/f4| | 2.63 |
| (R5 + R6)/(R5 − R6) | 0.82 | |f2/f5| | 4.87 |
| R1/ImgH | −0.85 | |f2/f6| | 3.25 |
| CT4/CT1 | 0.89 | Y11/Y62 | 0.75 |
| CT4/CT2 | 0.94 | Y11/EPD | 2.75 |

5th Embodiment

Figure 9:
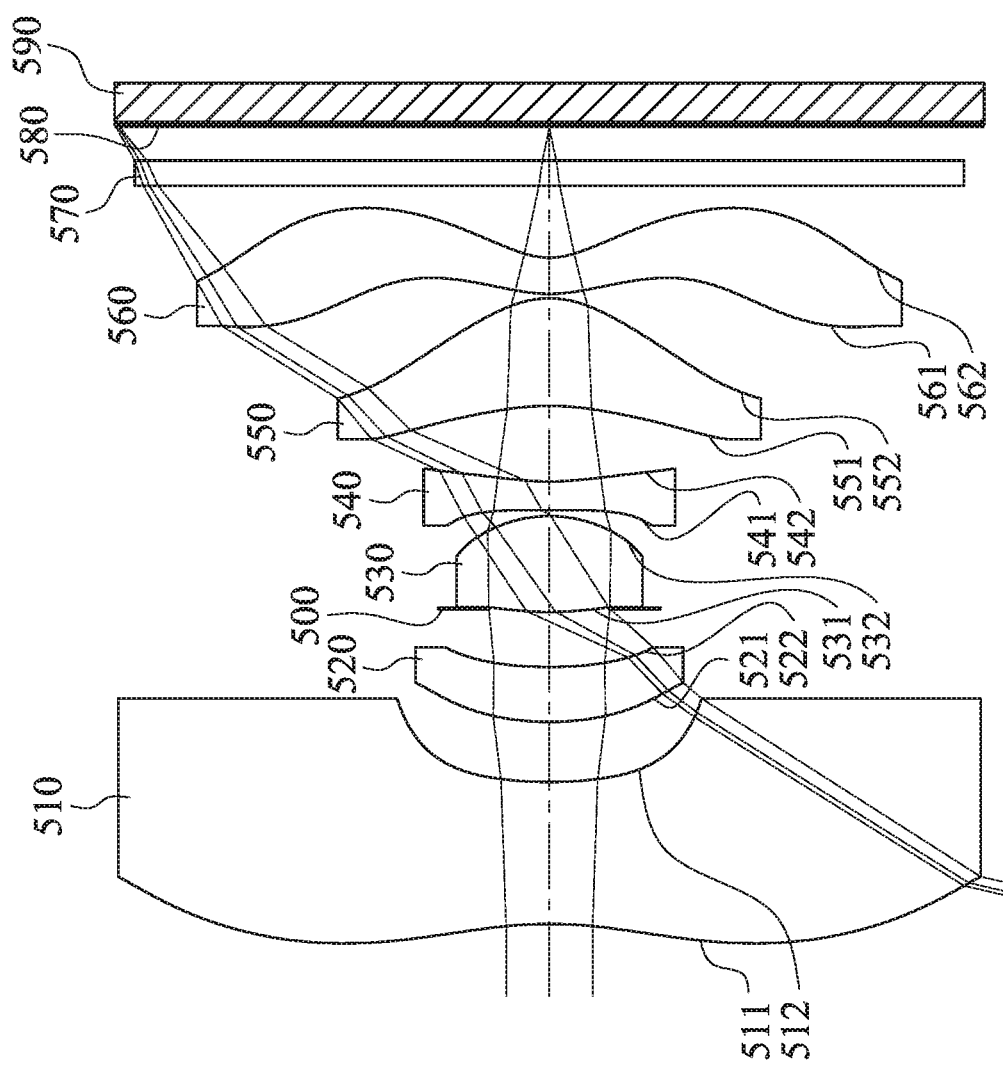
FIG. 9 is a schematic view of an image apparatus according to the 5th embodiment of the present disclosure.
Figure 10:
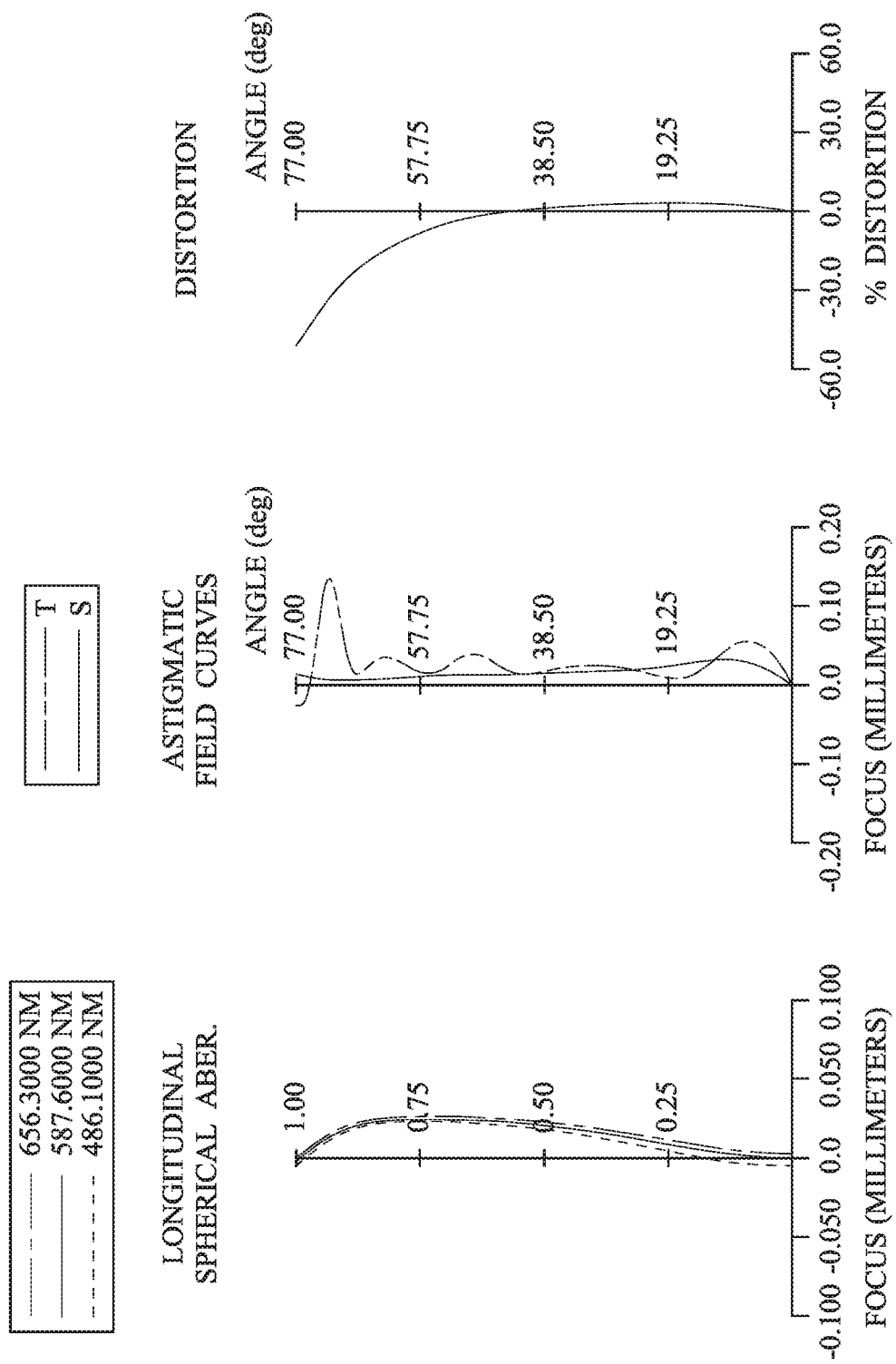
FIG. 10 shows spherical aberration curves, astigmatic field curves and a distortion curve of the image apparatus according to the 5th embodiment.

FIG. 9 is a schematic view of an image apparatus according to the 5th embodiment of the present disclosure. FIG. 10 shows spherical aberration curves, astigmatic field curves and a distortion curve of the image apparatus according to the 5th embodiment. In FIG. 9, the imaging apparatus includes a photographing optical lens assembly (its reference numeral is omitted) and an image sensor 590. The photographing optical lens assembly includes, in order from an object side to an image side, a first lens element 510, a second lens element 520, an aperture stop 500, a third lens element 530, a fourth lens element 540, a fifth lens element 550, a sixth lens element 560, an IR-cut filter 570, and an image surface 580, wherein the image sensor 590 is disposed on the image surface 580 of the photographing optical lens assembly. The photographing optical lens assembly includes six lens elements (510, 520, 530, 540, 550, 560) without additional one or more lens elements inserted between the first lens element 510 and the sixth lens element 560.

The first lens element 510 with negative refractive power has an object-side surface 511 being concave in a paraxial region thereof and an image-side surface 512 being concave in a paraxial region thereof. The first lens element 510 is made of a plastic material, and has the object-side surface 511 and the image-side surface 512 being both spherical. Furthermore, the object-side surface 511 of the first lens element 510 includes at least one convex shape in an off-axis region thereof and at least one convex critical point in the off-axis region thereof.

The second lens element 520 with positive refractive power has an object-side surface 521 being convex in a paraxial region thereof and an image-side surface 522 being concave in a paraxial region thereof. The second lens element 520 is made of a plastic material, and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of a plastic material, and has the object-side surface 531 and the image-side surface 532 being both aspheric.

The fourth lens element 540 with negative refractive power has an object-side surface 541 being convex in a paraxial region thereof and an image-side surface 542 being concave in a paraxial region thereof. The fourth lens element 540 is made of a plastic material, and has the object-side surface 541 and the image-side surface 542 being both aspheric.

The fifth lens element 550 with positive refractive power has an object-side surface 551 being concave in a paraxial region thereof and an image-side surface 552 being convex in a paraxial region thereof. The fifth lens element 550 is made of a plastic material, and has the object-side surface 551 and the image-side surface 552 being both aspheric.

The sixth lens element 560 with negative refractive power has an object-side surface 561 being convex in a paraxial region thereof and an image-side surface 562 being concave in a paraxial region thereof. The sixth lens element 560 is made of a plastic material, and has the object-side surface 561 and the image-side surface 562 being both aspheric. Furthermore, the image-side surface 562 of the sixth lens element 560 includes at least one convex shape in an off-axis region thereof.

The IR-cut filter 570 is made of glass and located between the sixth lens element 560 and the image plane 580, and will not affect the focal length of the photographing optical lens assembly.

The detailed optical data of the 5th embodiment are shown in Table 9 and the aspheric surface data are shown in Table 10 below.

TABLE 9

5th Embodiment
f = 1.41 mm, Fno = 2.35, HFOV = 77.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.784 | ASP | 0.984 | Plastic | 1.544 | 56.0 | −2.41 |
| 2 | | 2.784 | ASP | 0.416 | | | | |
| 3 | Lens 2 | 1.803 | ASP | 0.381 | Plastic | 1.656 | 21.3 | 6.83 |
| 4 | | 2.762 | ASP | 0.406 | | | | |
| 5 | Ape. Stop | Plano | | −0.024 | | | | |
| 6 | Lens 3 | 2.421 | ASP | 0.664 | Plastic | 1.544 | 56.0 | 1.31 |
| 7 | | −0.911 | ASP | 0.040 | | | | |
| 8 | Lens 4 | 14.975 | ASP | 0.200 | Plastic | 1.680 | 18.4 | −3.12 |
| 9 | | 1.849 | ASP | 0.524 | | | | |
| 10 | Lens 5 | −1.771 | ASP | 0.746 | Plastic | 1.544 | 56.0 | 1.47 |
| 11 | | −0.632 | ASP | 0.030 | | | | |
| 12 | Lens 6 | 0.897 | ASP | 0.250 | Plastic | 1.600 | 30.0 | −2.02 |
| 13 | | 0.462 | ASP | 0.500 | | | | |
| 14 | IR-cut filter | Plano | | 0.175 | Glass | 1.517 | 64.2 | — |
| 15 | | Plano | | 0.249 | | | | |
| 16 | Image | Plano | | — | | | | |

Reference wavelength is 587.6 nm (d-line).
Effective radius of Surface 10 is 1.230 mm.

TABLE 10

Aspheric Coefficients

| Surface # | 1 | 2 | 3 | 4 | 6 | 7 |
|---|---|---|---|---|---|---|
| k= | −3.0112E−01 | −7.7187E+00 | 5.5093E−02 | −6.6815E+01 | 1.0925E+01 | 1.4983E−01 |
| A4= | 9.6770E−02 | 1.6731E−02 | −1.0191E−01 | 3.8851E−01 | −1.3080E−01 | 1.3452E−01 |
| A6= | −2.7813E−02 | 6.0945E−01 | 6.2185E−01 | −8.6079E−02 | −4.5366E−01 | −1.2647E+00 |
| A8= | 6.6313E−03 | −1.1648E+00 | −8.2010E−01 | −6.6576E−01 | −5.5388E−02 | 1.8242E+01 |
| A10= | −1.0874E−03 | 1.7310E+00 | 3.0775E−01 | 9.5163E−01 | −5.1569E+00 | −1.1543E+02 |
| A12= | 1.1436E−04 | −1.3959E+00 | | | | 3.5829E+02 |
| A14= | −6.7781E−06 | 4.9005E−01 | | | | −5.7719E+02 |
| A16= | 1.7119E−07 | | | | | 3.7852E+02 |

| Surface # | 8 | 9 | 10 | 11 | 12 | 13 |
|---|---|---|---|---|---|---|
| k= | −2.0199E+01 | −2.3119E+00 | 6.8824E−01 | −1.9442E+00 | −1.5977E+01 | −4.3391E+00 |
| A4= | −6.5190E−01 | −5.3991E−01 | 2.1312E−01 | 1.3972E−01 | −7.3717E−02 | −1.6892E−01 |
| A6= | 4.9868E−01 | 9.4842E−01 | 2.8355E−01 | −1.9799E−02 | −9.5784E−02 | 9.1001E−02 |
| A8= | 6.2367E+00 | −6.2476E−01 | −1.3794E+00 | −1.5978E−01 | 8.1533E−02 | −3.6577E−02 |
| A10= | −4.1006E+01 | −7.9482E−01 | 2.1275E+00 | 1.7131E−01 | −2.6138E−02 | 9.5084E−03 |
| A12= | 1.1234E+02 | 1.6757E+00 | −1.6005E+00 | −5.7763E−02 | 4.3175E−03 | −1.5659E−03 |
| A14= | −1.6594E+02 | −9.4585E−01 | 5.9937E−01 | 1.4918E−03 | −3.6530E−04 | 1.5181E−04 |
| A16= | 1.0573E+02 | 1.6999E−01 | −8.8198E−02 | 1.6842E−03 | 1.2469E−05 | −6.5063E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 1.41 | CT4/CT3 | 0.30 |
| Fno. | 2.35 | CT4/CT5 | 0.27 |
| HFOV [deg.] | 77.0 | CT4/CT6 | 0.80 |
| FOV [deg.] | 154.0 | TL/ImgH | 1.85 |
| V32 | 3 | f1/f2 | −0.35 |

-continued

| 5th Embodiment | | | |
|---|---|---|---|
| V2 + V4 + V6 | 69.7 | f1/f6 | 1.19 |
| V6/N6 | 18.75 | |f2/f1| | 2.84 |
| (R1 + R2)/(R1 − R2) | 0.00 | |f2/f3| | 5.22 |
| |R3/R4| | 0.65 | |f2/f4| | 2.19 |
| (R5 + R6)/(R5 − R6) | 0.45 | |f2/f5| | 4.65 |
| R1/ImgH | −0.93 | |f2/f6| | 3.38 |
| CT4/CT1 | 0.20 | Y11/Y62 | 1.22 |
| CT4/CT2 | 0.52 | Y11/EPD | 4.98 |

6th Embodiment

Figure 11:
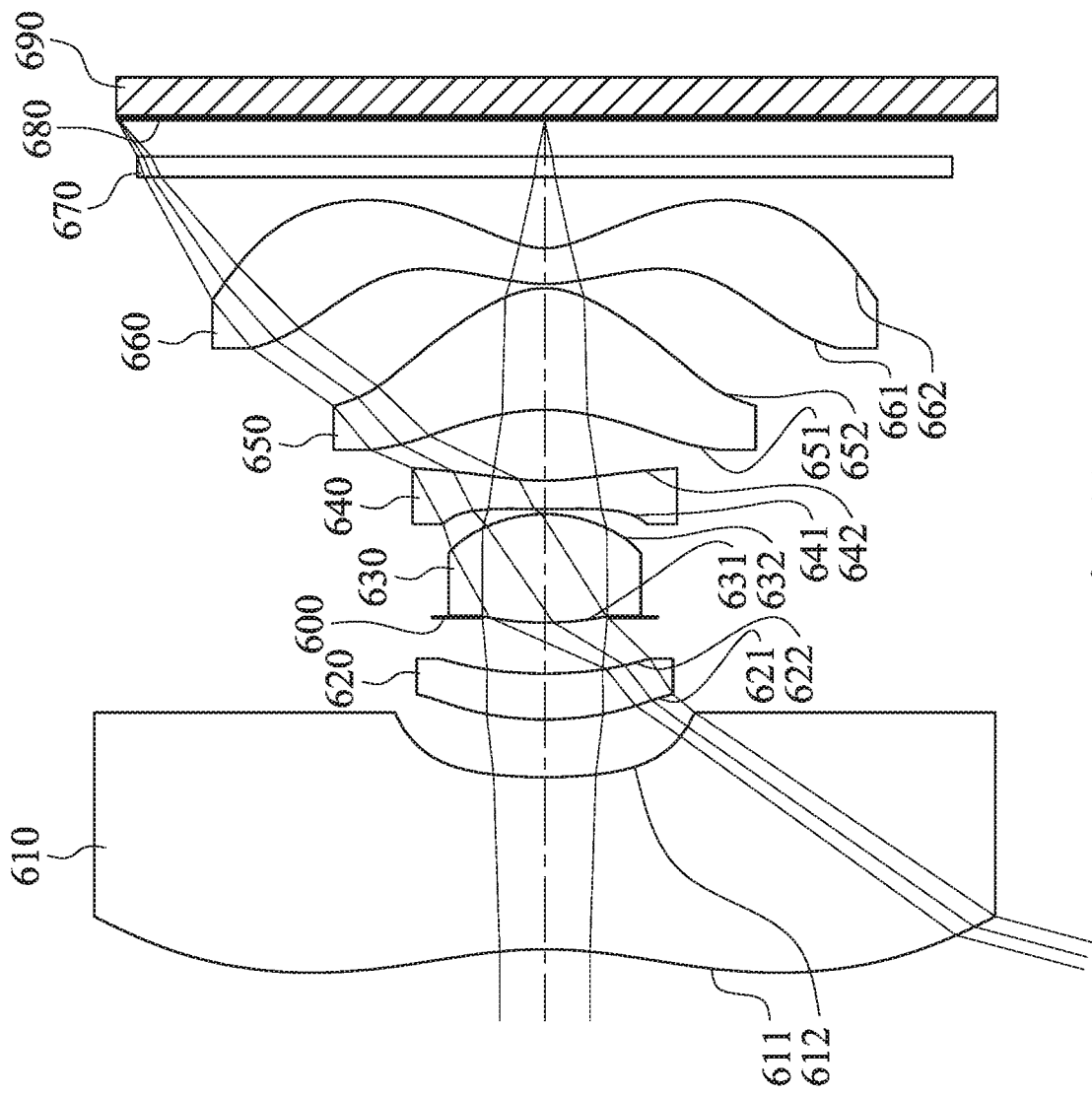
FIG. 11 is a schematic view of an image apparatus according to the 6th embodiment of the present disclosure.
Figure 12:
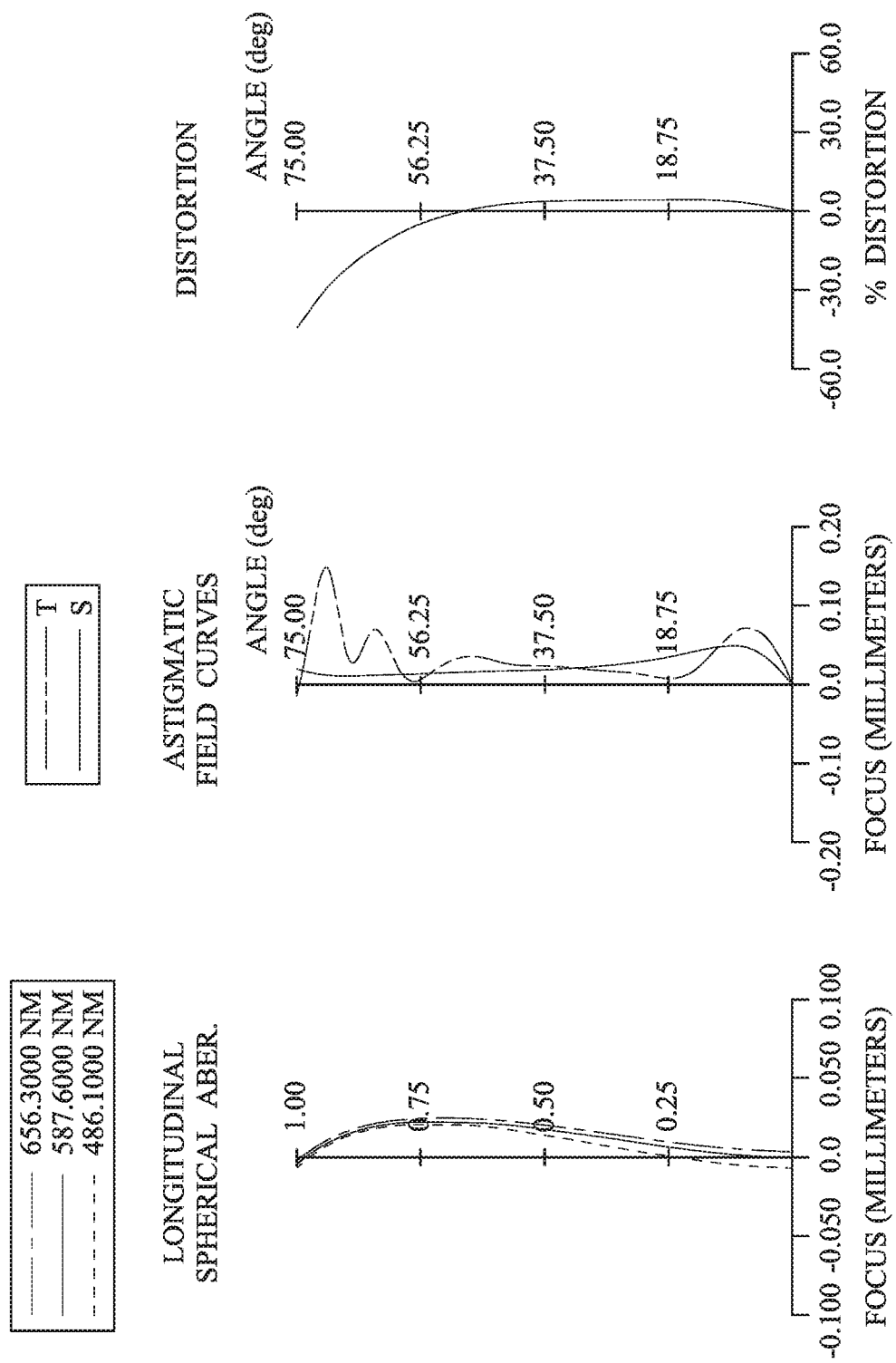
FIG. 12 shows spherical aberration curves, astigmatic field curves and a distortion curve of the image apparatus according to the 6th embodiment.

FIG. 11 is a schematic view of an image apparatus according to the 6th embodiment of the present disclosure. FIG. 12 shows spherical aberration curves, astigmatic field curves and a distortion curve of the image apparatus according to the 6th embodiment. In FIG. 11, the imaging apparatus includes a photographing optical lens assembly (its reference numeral is omitted) and an image sensor 690. The photographing optical lens assembly includes, in order from an object side to an image side, a first lens element 610, a second lens element 620, an aperture stop 600, a third lens element 630, a fourth lens element 640, a fifth lens element 650, a sixth lens element 660, an IR-cut filter 670, and an image surface 680, wherein the image sensor 690 is disposed on the image surface 680 of the photographing optical lens assembly. The photographing optical lens assembly includes six lens elements (610, 620, 630, 640, 650, 660) without additional one or more lens elements inserted between the first lens element 610 and the sixth lens element 660.

The first lens element 610 with negative refractive power has an object-side surface 611 being concave in a paraxial region thereof and an image-side surface 612 being concave in a paraxial region thereof. The first lens element 610 is made of a plastic material, and has the object-side surface 611 and the image-side surface 612 being both spherical. Furthermore, the object-side surface 611 of the first lens element 610 includes at least one convex shape in an off-axis region thereof and at least one convex critical point in the off-axis region thereof in an off-axis region thereof.

The second lens element 620 with positive refractive power has an object-side surface 621 being convex in a paraxial region thereof and an image-side surface 622 being concave in a paraxial region thereof. The second lens element 620 is made of a plastic material, and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of a plastic material, and has the object-side surface 631 and the image-side surface 632 being both aspheric.

The fourth lens element 640 with negative refractive power has an object-side surface 641 being convex in a paraxial region thereof and an image-side surface 642 being concave in a paraxial region thereof. The fourth lens element 640 is made of a plastic material, and has the object-side surface 641 and the image-side surface 642 being both aspheric.

The fifth lens element 650 with positive refractive power has an object-side surface 651 being concave in a paraxial region thereof and an image-side surface 652 being convex in a paraxial region thereof. The fifth lens element 650 is made of a plastic material, and has the object-side surface 651 and the image-side surface 652 being both aspheric.

The sixth lens element 660 with negative refractive power has an object-side surface 661 being convex in a paraxial region thereof and an image-side surface 662 being concave in a paraxial region thereof. The sixth lens element 660 is made of a plastic material, and has the object-side surface 661 and the image-side surface 662 being both aspheric. Furthermore, the image-side surface 662 of the sixth lens element 660 includes at least one convex shape in an off-axis region thereof.

The IR-cut filter 670 is made of glass and located between the sixth lens element 660 and the image plane 680, and will not affect the focal length of the photographing optical lens assembly.

The detailed optical data of the 6th embodiment are shown in Table 11 and the aspheric surface data are shown in Table 12 below.

TABLE 11

6th Embodiment
f = 1.43 mm, Fno = 2.27, HFOV = 75.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | -2.997 | ASP | 1.206 | Plastic | 1.545 | 56.1 | -2.71 |
| 2 | | 3.313 | ASP | 0.405 | | | | |
| 3 | Lens 2 | 2.111 | ASP | 0.322 | Plastic | 1.700 | 17.5 | 9.27 |
| 4 | | 2.932 | ASP | 0.394 | | | | |
| 5 | Ape. Stop | Plano | | -0.037 | | | | |
| 6 | Lens 3 | 2.133 | ASP | 0.761 | Plastic | 1.544 | 56.0 | 1.35 |
| 7 | | -0.979 | ASP | 0.035 | | | | |
| 8 | Lens 4 | 6.749 | ASP | 0.200 | Plastic | 1.700 | 18.0 | -3.47 |
| 9 | | 1.763 | ASP | 0.495 | | | | |
| 10 | Lens 5 | -1.379 | ASP | 0.853 | Plastic | 1.544 | 56.0 | 1.28 |
| 11 | | -0.564 | ASP | 0.030 | | | | |
| 12 | Lens 6 | 0.920 | ASP | 0.250 | Plastic | 1.603 | 28.5 | -1.78 |
| 13 | | 0.445 | ASP | 0.500 | | | | |
| 14 | IR-cut filter | Plano | | 0.145 | Glass | 1.517 | 64.2 | — |
| 15 | | Plano | | 0.268 | | | | |
| 16 | Image | Plano | | — | | | | |

Reference wavelength is 587.6 nm (d-line).
Effective radius of Surface 10 is 1.220 mm

TABLE 12

Aspheric Coefficients

| Surface # | 1 | 2 | 3 | 4 | 6 | 7 |
|---|---|---|---|---|---|---|
| k= | -2.7278E-01 | -7.7359E+01 | -1.9045E+00 | -9.0000E+01 | 1.0709E+01 | 1.1028E-02 |
| A4= | 7.1073E-02 | 2.0903E-01 | -1.0903E-01 | 3.3735E-01 | -1.0637E-01 | -1.4256E-02 |
| A6= | -1.6985E-02 | -5.3784E-02 | 6.3932E-01 | -2.3176E-01 | -6.0839E-01 | 7.0397E-01 |

TABLE 12-continued

| Aspheric Coefficients | | | | | | |
|---|---|---|---|---|---|---|
| A8= | 3.5590E−03 | 1.5479E−01 | −9.5967E−01 | −3.4169E−01 | 8.7023E−01 | 9.7264E−01 |
| A10= | −5.2782E−04 | 1.2692E−03 | 3.9349E−01 | 4.1981E−01 | −5.6867E+00 | −1.8203E+01 |
| A12= | 5.1313E−05 | −1.1817E−01 | | | | 4.6313E+01 |
| A14= | −2.8543E−06 | 8.6094E−02 | | | | −5.0285E+01 |
| A16= | 6.8557E−08 | | | | | 1.8444E+01 |

| Surface # | 8 | 9 | 10 | 11 | 12 | 13 |
|---|---|---|---|---|---|---|
| k= | −6.1798E+01 | −2.9278E+00 | 3.5958E−02 | −2.2237E+00 | −2.4255E+01 | −5.2154E+00 |
| A4= | −6.6651E−01 | −5.1454E−01 | 2.4458E−01 | 6.2887E−02 | 4.5829E−02 | −8.7136E−02 |
| A6= | 6.0876E−01 | 7.1764E−01 | 1.8805E−01 | −1.9329E−01 | −2.6367E−01 | 5.0125E−04 |
| A8= | 5.2602E+00 | 2.8118E−01 | −1.2867E+00 | 2.8490E−01 | 1.9162E−01 | 1.2731E−02 |
| A10= | −3.4512E+01 | −2.9477E+00 | 2.2497E+00 | −3.2660E−01 | −7.1441E−02 | −5.8314E−03 |
| A12= | 8.9149E+01 | 4.6510E+00 | −1.7591E+00 | 2.4672E−01 | 1.5687E−02 | 1.2163E−03 |
| A14= | −1.2203E+02 | −3.2014E+00 | 6.4633E−01 | −9.2553E−02 | −1.9080E−03 | −1.2947E−04 |
| A16= | 6.8789E+01 | 8.6086E−01 | −8.8913E−02 | 1.3037E−02 | 9.8212E−05 | 5.8090E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.43 | CT4/CT3 | 0.26 |
| Fno. | 2.27 | CT4/CT5 | 0.23 |
| HFOV [deg.] | 75.0 | CT4/CT6 | 0.80 |
| FOV [deg.] | 150.0 | TL/ImgH | 1.95 |
| V32 | 3 | f1/f2 | −0.29 |
| V2 + V4 + V6 | 64.0 | f1/f6 | 1.52 |
| V6/N6 | 17.78 | |f2/f1| | 3.43 |
| (R1 + R2)/(R1− R2) | −0.05 | |f2/f3| | 6.87 |
| |R3/R4| | 0.72 | |f2/f4| | 2.67 |
| (R5 + R6)/(R5 − R6) | 0.37 | |f2/f5| | 7.23 |
| R1/ImgH | −1.00 | |f2/f6| | 5.21 |
| CT4/CT1 | 0.17 | Y11/Y62 | 1.36 |
| CT4/CT2 | 0.62 | Y11/EPD | 5.00 |

7th Embodiment

Figure 13:
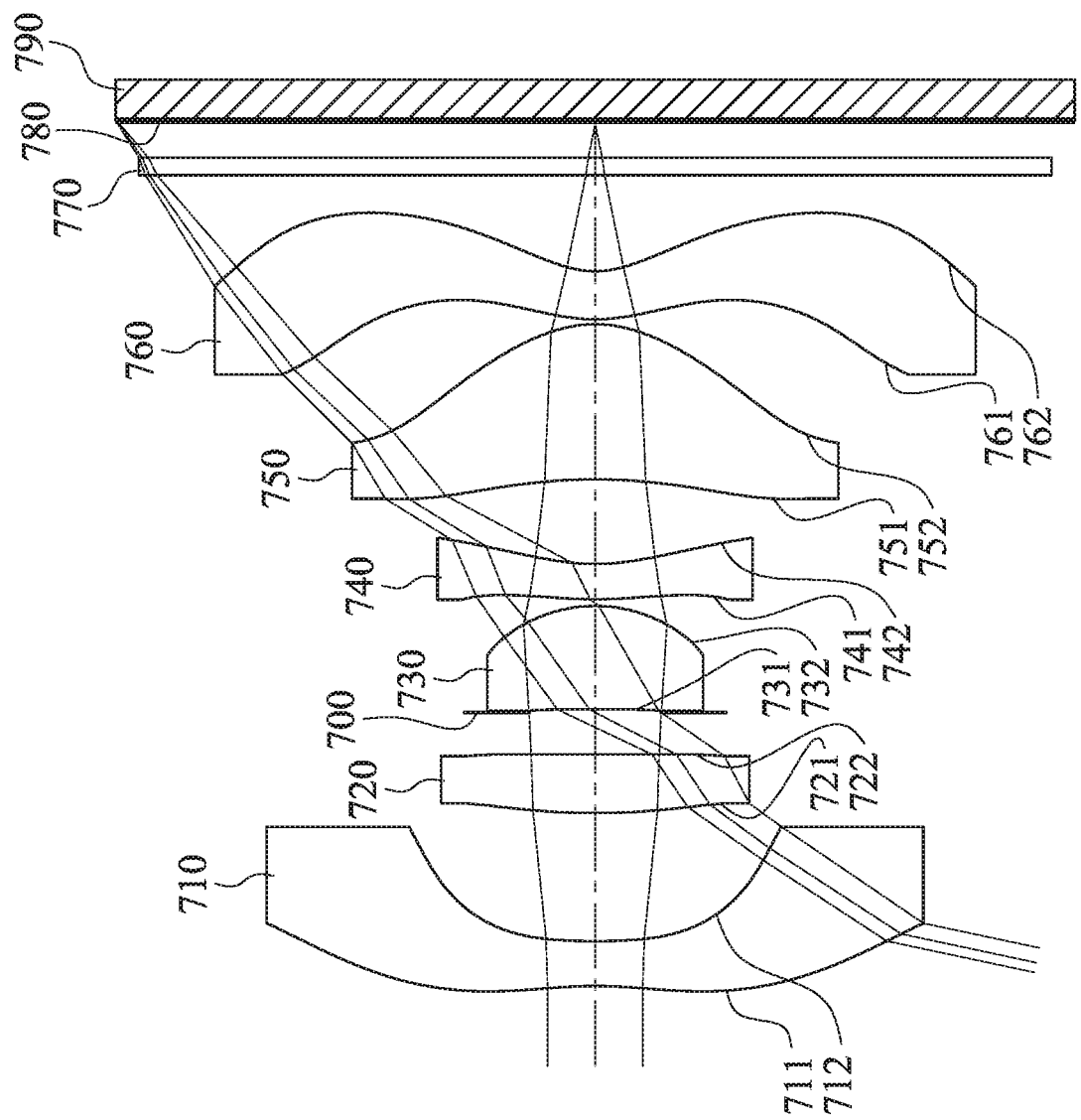
FIG. 13 is a schematic view of an image apparatus according to the 7th embodiment of the present disclosure.
Figure 14:
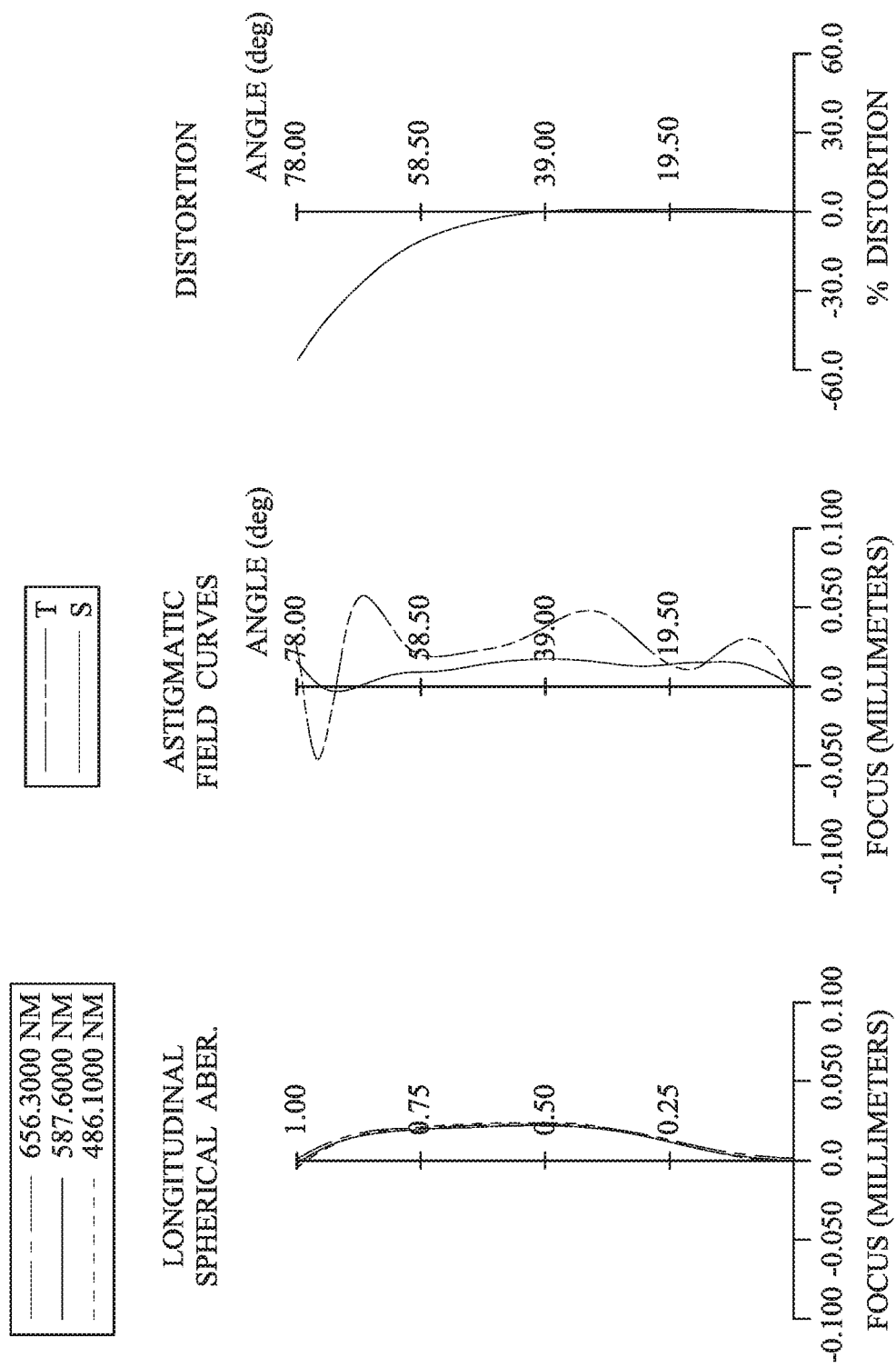
FIG. 14 shows spherical aberration curves, astigmatic field curves and a distortion curve of the image apparatus according to the 7th embodiment.

FIG. 13 is a schematic view of an image apparatus according to the 7th embodiment of the present disclosure. FIG. 14 shows spherical aberration curves, astigmatic field curves and a distortion curve of the image apparatus according to the 7th embodiment. In FIG. 13, the imaging apparatus includes a photographing optical lens assembly (its reference numeral is omitted) and an image sensor 790. The photographing optical lens assembly includes, in order from an object side to an image side, a first lens element 710, a second lens element 720, an aperture stop 700, a third lens element 730, a fourth lens element 740, a fifth lens element 750, a sixth lens element 760, an IR-cut filter 770, and an image surface 780, wherein the image sensor 790 is disposed on the image surface 780 of the photographing optical lens assembly. The photographing optical lens assembly includes six lens elements (710, 720, 730, 740, 750, 760) without additional one or more lens elements inserted between the first lens element 710 and the sixth lens element 760.

The first lens element 710 with negative refractive power has an object-side surface 711 being concave in a paraxial region thereof and an image-side surface 712 being concave in a paraxial region thereof. The first lens element 710 is made of a plastic material, and has the object-side surface 711 and the image-side surface 712 being both spherical. Furthermore, the object-side surface 711 of the first lens element 710 includes at least one convex shape in an off-axis region thereof and at least one convex critical point in the off-axis region thereof.

The second lens element 720 with positive refractive power has an object-side surface 721 being convex in a paraxial region thereof and an image-side surface 722 being convex in a paraxial region thereof. The second lens element 720 is made of a plastic material, and has the object-side surface 721 and the image-side surface 722 being both aspheric.

The third lens element 730 with positive refractive power has an object-side surface 731 being concave in a paraxial region thereof and an image-side surface 732 being convex in a paraxial region thereof. The third lens element 730 is made of a plastic material, and has the object-side surface 731 and the image-side surface 732 being both aspheric.

The fourth lens element 740 with negative refractive power has an object-side surface 741 being convex in a paraxial region thereof and an image-side surface 742 being concave in a paraxial region thereof. The fourth lens element 740 is made of a plastic material, and has the object-side surface 741 and the image-side surface 742 being both aspheric.

The fifth lens element 750 with positive refractive power has an object-side surface 751 being concave in a paraxial region thereof and an image-side surface 752 being convex in a paraxial region thereof. The fifth lens element 750 is made of a plastic material, and has the object-side surface 751 and the image-side surface 752 being both aspheric.

The sixth lens element 760 with negative refractive power has an object-side surface 761 being convex in a paraxial region thereof and an image-side surface 762 being concave in a paraxial region thereof. The sixth lens element 760 is made of a plastic material, and has the object-side surface 761 and the image-side surface 762 being both aspheric. Furthermore, the image-side surface 762 of the sixth lens element 760 includes at least one convex shape in an off-axis region thereof.

The IR-cut filter 770 is made of glass and located between the sixth lens element 760 and the image plane 780, and will not affect the focal length of the photographing optical lens assembly.

The detailed optical data of the 7th embodiment are shown in Table 13 and the aspheric surface data are shown in Table 14 below.

TABLE 13

7th Embodiment
f = 1.45 mm, Fno = 2.43, HFOV = 78.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.661 | ASP | 0.280 | Plastic | 1.545 | 56.1 | −2.98 |
| 2 | | 4.307 | ASP | 0.800 | | | | |
| 3 | Lens 2 | 4.179 | ASP | 0.367 | Plastic | 1.600 | 32.0 | 6.71 |
| 4 | | −106.878 | ASP | 0.262 | | | | |
| 5 | Ape. Stop | Plano | | 0.019 | | | | |
| 6 | Lens 3 | −96.558 | ASP | 0.646 | Plastic | 1.544 | 56.0 | 1.65 |
| 7 | | −0.893 | ASP | 0.042 | | | | |
| 8 | Lens 4 | 2.640 | ASP | 0.220 | Plastic | 1.710 | 17.5 | −3.94 |
| 9 | | 1.311 | ASP | 0.529 | | | | |
| 10 | Lens 5 | −3.004 | ASP | 0.969 | Plastic | 1.544 | 56.0 | 1.62 |
| 11 | | −0.759 | ASP | 0.030 | | | | |
| 12 | Lens 6 | 1.014 | ASP | 0.300 | Plastic | 1.710 | 17.5 | −2.26 |
| 13 | | 0.545 | ASP | 0.600 | | | | |
| 14 | IR-cut filter | Plano | | 0.110 | Glass | 1.517 | 64.2 | — |
| 15 | | Plano | | 0.232 | | | | |
| 16 | Image | Plano | | — | | | | |

Reference wavelength is 587.6 nm (d-line).
Effective radius of Surface 12 is 1.950 mm.

TABLE 14

Aspheric Coefficients

| Surface # | 1 | 2 | 3 | 4 | 6 | 7 |
|---|---|---|---|---|---|---|
| k= | 4.1585E−01 | −3.4947E+01 | −1.6958E+01 | −9.0000E+01 | 9.0000E+01 | −6.1819E−02 |
| A4= | 3.5720E−01 | 3.5395E−01 | −1.2846E−02 | 3.1470E−02 | −1.4735E−01 | 7.9114E−02 |
| A6= | −2.7840E−01 | 1.9206E−01 | 9.2593E−02 | −5.7561E−02 | −4.4728E−01 | −6.2055E−01 |
| A8= | 1.5608E−01 | −7.0728E−01 | −2.3107E−01 | −8.1263E−02 | −1.6619E−02 | 1.0779E+01 |
| A10= | −5.5527E−02 | 7.1718E−01 | 1.0673E−01 | 7.9398E−02 | −3.1015E+00 | −7.0274E+01 |
| A12= | 1.1952E−02 | −1.9277E−01 | | | | 2.1289E+02 |
| A14= | −1.4199E−03 | −2.6207E−02 | | | | −3.1960E+02 |
| A16 = | 7.2030E−05 | | | | | 1.8787E+02 |

| Surface # | 8 | 9 | 10 | 11 | 12 | 13 |
|---|---|---|---|---|---|---|
| k = | 1.2812E+00 | −2.5052E+00 | 2.3516E+00 | −1.4561E+00 | −1.0197E+01 | −4.0118E+00 |
| A4= | −6.2926E−01 | −5.5567E−01 | 1.4821E−01 | 2.5113E−01 | −1.0107E−01 | −1.7933E−01 |
| A6= | 1.7331E+00 | 1.3244E+00 | −2.9107E−01 | −4.4391E−01 | −1.4234E−01 | 1.1477E−01 |
| A8= | −3.9258E+00 | −2.2491E+00 | 4.2697E−01 | 4.5458E−01 | 2.0802E−01 | −5.3238E−02 |
| A10= | 4.1897E+00 | 2.2959E+00 | −2.9676E−01 | −2.7760E−01 | −1.2132E−01 | 1.6642E−02 |
| A12= | −5.1531E−01 | −1.2293E+00 | 9.9102E−02 | 1.1566E−01 | 3.6169E−02 | −3.3234E−03 |
| A14= | −2.8059E+00 | 2.3139E−01 | −1.2126E−02 | −2.9898E−02 | −5.3642E−03 | 3.7084E−04 |
| A16= | 1.7279E+00 | 2.6484E−02 | −2.1929E−04 | 3.4035E−03 | 3.1299E−04 | −1.7222E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.45 | CT4/CT3 | 0.34 |
| Fno. | 2.43 | CT4/CT5 | 0.23 |
| HFOV [deg.] | 78.0 | CT4/CT6 | 0.73 |
| FOV [deg.] | 156.0 | TL/ImgH | 1.81 |
| V32 | 3 | f1/f2 | −0.44 |

-continued

| 7th Embodiment | | | |
|---|---|---|---|
| V2 + V4 + V6 | 67.0 | f1/f6 | 1.32 |
| V6/N6 | 10.23 | |f2/f1| | 2.25 |
| (R1 + R2)/(R1 − R2) | −0.24 | |f2/f3| | 4.06 |
| |R3/R4| | 0.04 | |f2/f4| | 1.70 |
| (R5 + R6)/(R5 − R6) | 1.02 | |f2/f5| | 4.14 |
| R1/ImgH | −0.89 | |f2/f6| | 2.97 |
| CT4/CT1 | 0.79 | Y11/Y62 | 0.86 |
| CT4/CT2 | 0.60 | Y11/EPD | 3.44 |

8th Embodiment

Figure 16:
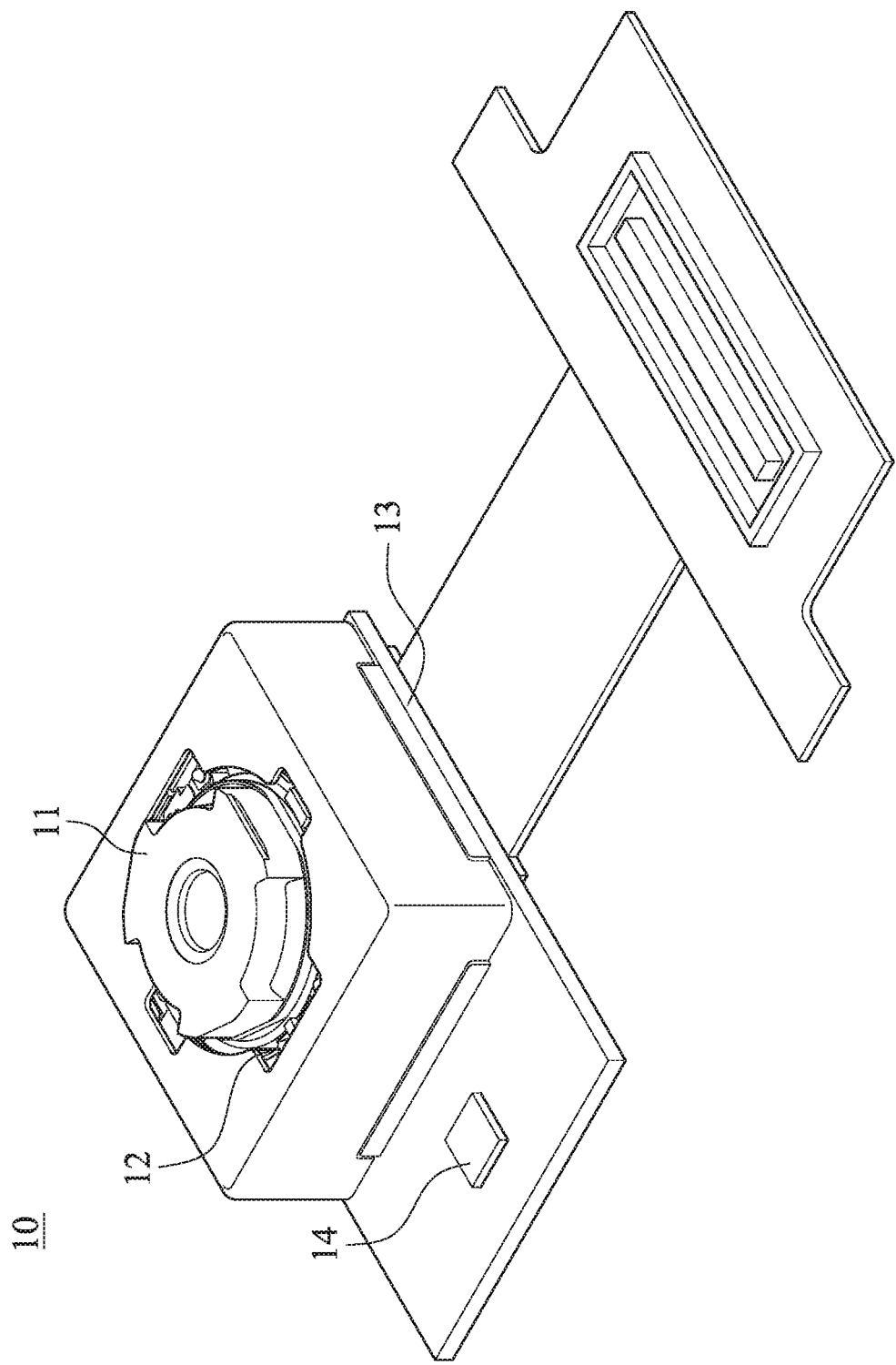
FIG. 16 is a three-dimensional schematic view of an image apparatus according to the 8th embodiment of the present disclosure.

FIG. 16 is a three-dimensional schematic view of an image apparatus 10 according to the 8th embodiment of the present disclosure. In FIG. 16, the imaging apparatus 10 of the 8th embodiment is a camera module, the imaging apparatus 10 includes an imaging lens assembly 11, a driving apparatus 12 and an image sensor 13, wherein the imaging lens assembly 11 includes the photographing optical lens assembly of the 1st embodiment and a lens barrel (not shown in drawings) for carrying the photographing optical lens assembly. The imaging apparatus 10 can focus light from an imaged object via the imaging lens assembly 11, perform image focusing by the driving apparatus 12, and generate an image on the image sensor 13, and the imaging information can be transmitted.

The driving apparatus 12 can be an auto-focus module, which can be driven by driving systems, such as voice coil motors (VCM), micro electro-mechanical systems (MEMS), piezoelectric systems, and shape memory alloys etc. The photographing optical lens assembly can obtain a favorable imaging position by the driving apparatus 12 so as to capture clear images when the imaged object is disposed at different object distances.

The imaging apparatus 10 can include the image sensor 13 located on the image surface of the photographing optical lens assembly, such as CMOS and CCD, with superior photosensitivity and low noise. Thus, it is favorable for providing realistic images with high definition image quality thereof.

Moreover, the imaging apparatus 10 can further include an image stabilization module 14, which can be a kinetic energy sensor, such as an accelerometer, a gyro sensor, and a Hall Effect sensor. In the 8th embodiment, the image stabilization module 14 is a gyro sensor, but is not limited thereto. Therefore, the variation of different axial directions of the photographing optical lens assembly can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

9th Embodiment

Figure 17A:
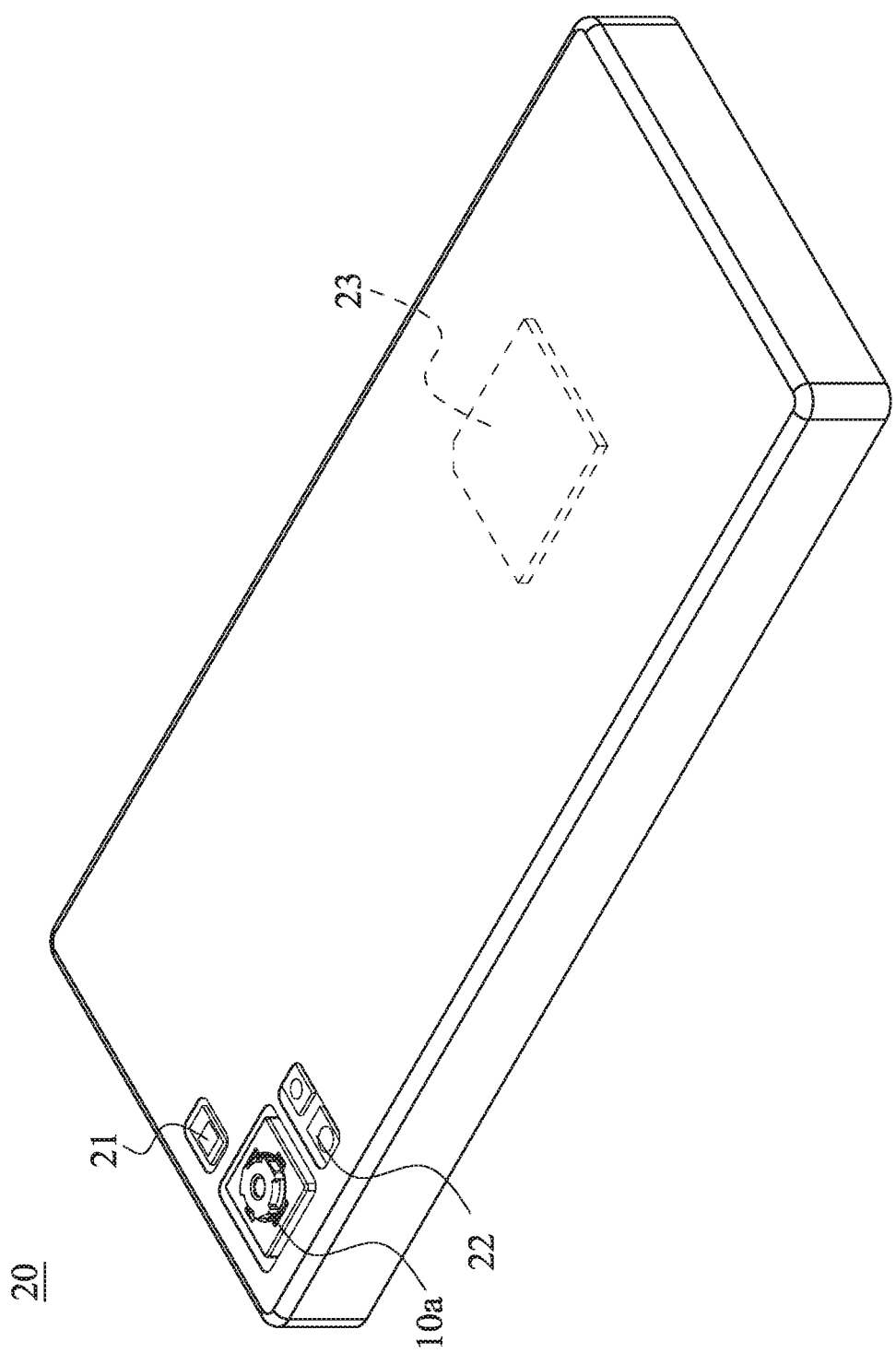
FIG. 17A is a schematic view of one side of an electronic device according to the 9th embodiment of the present disclosure.
Figure 17B:
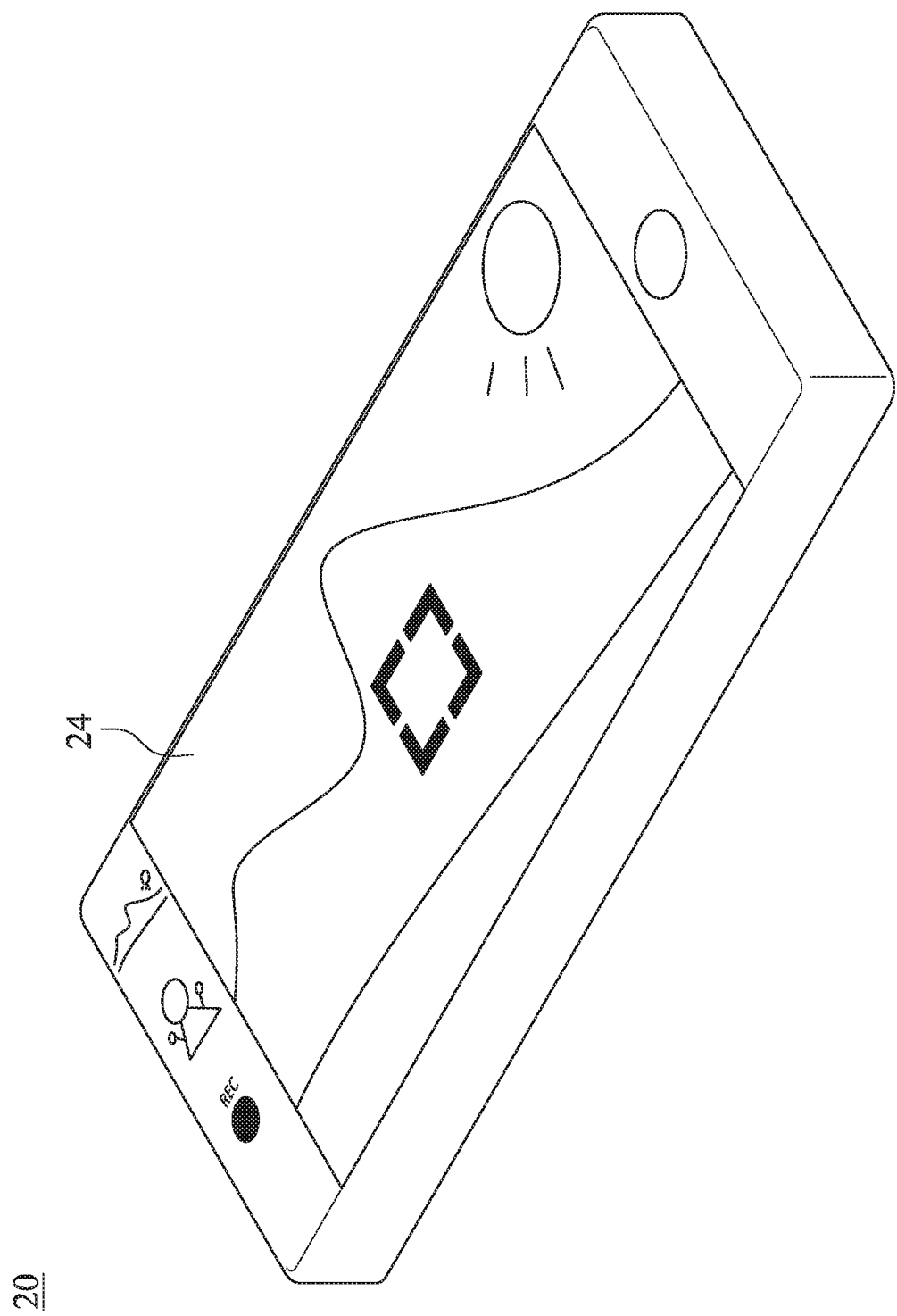
FIG. 17B is a schematic view of another side of the electronic device of FIG. 17A.
Figure 17C:
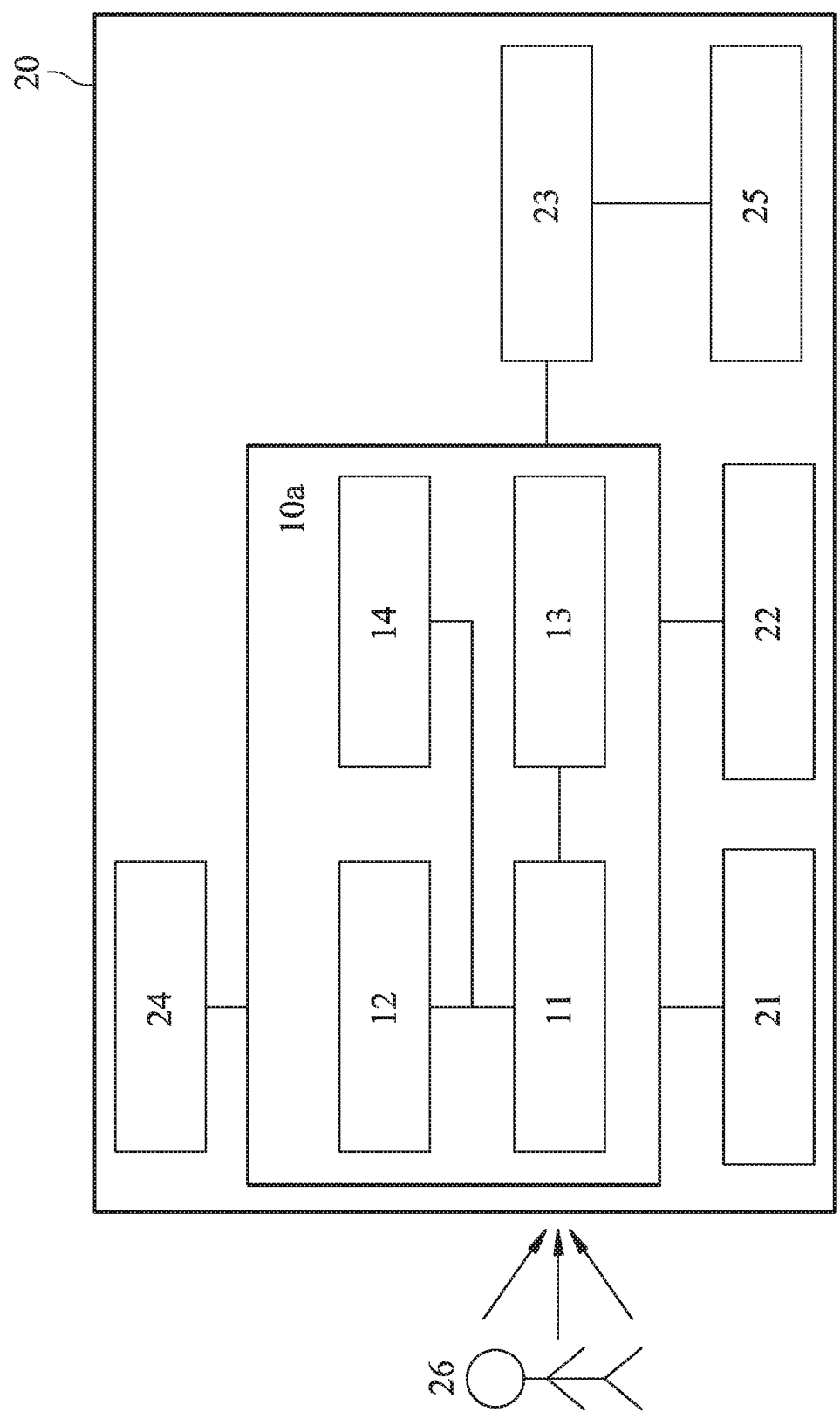
FIG. 17C is a system schematic view of the electronic device of FIG. 17A.

FIG. 17A is a schematic view of one side of an electronic device 20 according to the 9th embodiment of the present disclosure. FIG. 17B is a schematic view of another side of the electronic device 20 of FIG. 17A. FIG. 17C is a system schematic view of the electronic device 20 of FIG. 17A. In FIGS. 17A, 17B and 17C, the electronic device 20 according to the 9th embodiment is a smartphone, wherein the electronic device 20 includes an imaging apparatus 10a, a flash module 21, a focusing assisting module 22, an image signal processor (ISP) 23, a user interface 24 and an image software processor 25. When the user captures images of an imaged object 26 via the user interface 24, the electronic device 20 focuses and generates an image via the imaging apparatus 10a while compensating for low illumination via the flash module 21 when necessary. Then, the electronic device 20 quickly focuses on the imaged object according to its object distance information provided by the focusing assisting module 22, and optimizes the image via the image signal processor 23 and the image software processor 25. Thus, the image quality can be further enhanced. The focusing assisting module 22 can adopt conventional infrared or laser for obtaining quick focusing, and the user interface 24 can utilize a touch screen or a physical button for capturing and processing the image with various functions of the image processing software.

According to the 9th embodiment, the imaging apparatus 10a can be the same with the imaging apparatus 10 according to the 8th embodiment (in FIG. 17C, the reference numeral of each element of the imaging apparatus 10a is the same with the reference numeral of the corresponding element in FIG. 16), or the imaging apparatus 10a also can include a lens assembly which can be the same or different with the photographing optical lens assembly of the present disclosure, and will not describe again herein. Moreover, the imaging apparatus 10a can include an image sensor, which can be disposed on the image surface of the lens assembly thereof or the image surface of the photographing optical lens assembly, wherein the arrangement of the image sensor of the imaging apparatus 10a is the same with the image sensor 13 of the imaging apparatus 10 in the 8th embodiment, hence, the reference numeral of the image sensor in the 9th embodiment is labeled corresponding to the image sensor 13 in the 8th embodiment.

10th Embodiment

Figure 18B:
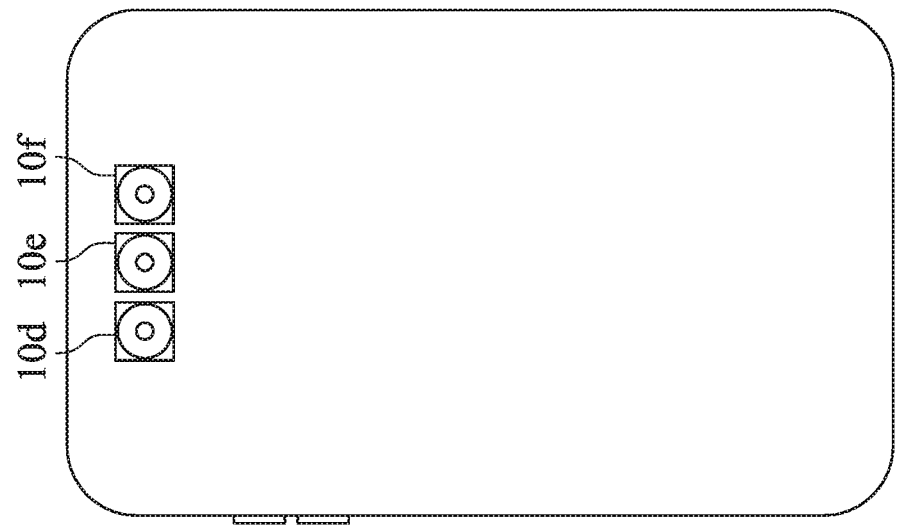
FIG. 18B is a schematic view of another side of the electronic device of FIG. 18A.
Figure 18A:
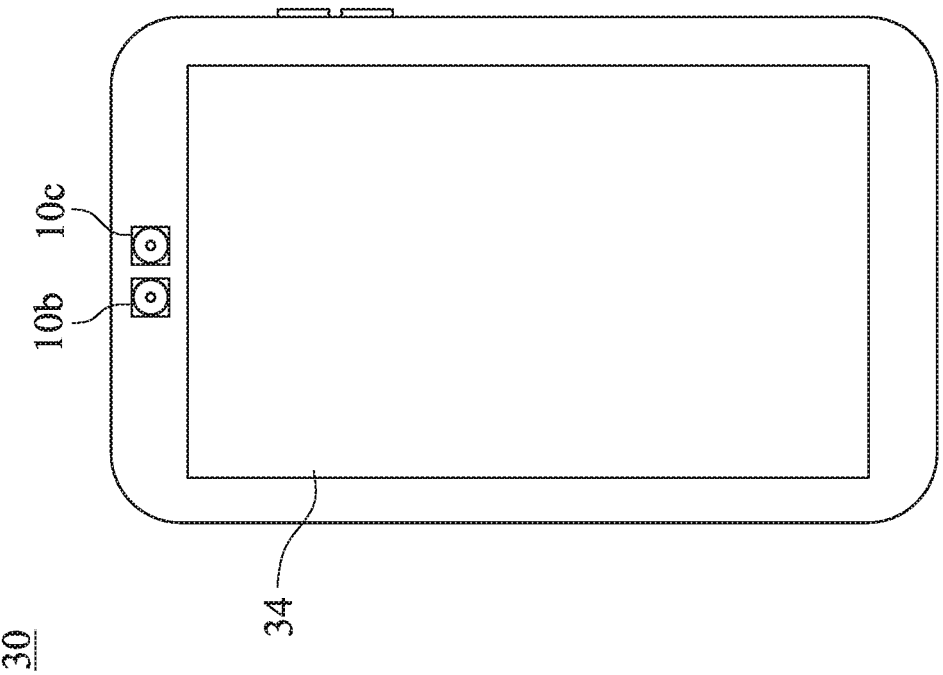
FIG. 18A is a schematic view of one side of an electronic device according to the 10th embodiment of the present disclosure.

FIG. 18A is a schematic view of one side of an electronic device 30 according to the 10th embodiment of the present disclosure. FIG. 18B is a schematic view of another side of the electronic device 30 of FIG. 18A. In FIGS. 18A and 18B, the electronic device 30 according to the 10th embodiment is a tablet, wherein the electronic device 30 includes five imaging apparatuses 10b, 10c, 10d, 10e, 10f, a user interface 34 and an image software processor (not shown in drawings). The imaging apparatuses 10b, 10c are front imaging apparatuses, and the imaging apparatuses 10d, 10e, 10f are rear imaging apparatuses. As the description according to the 9th embodiment, when the user captures images of an imaged object (not shown in drawings) via the user interface 34, the electronic device 30 focuses and generates an image via the imaging apparatuses 10b, 10c, 10d, 10e, 10f. Then, the electronic device 30 optimizes the image via the image software processor. Thus, the image quality can be further enhanced. The user interface 34 can utilize a touch screen or a physical button for capturing and processing the image with various functions of the image processing software.

According to the 10th embodiment, the five imaging apparatuses 10b, 10c, 10d, 10e, 10f can be the same with the imaging apparatus 10 according to the 8th embodiment, and will not described again herein. In detail, the imaging apparatuses 10b, 10c according to the 10th embodiment can be a wide angle imaging apparatus and a super wide angle imaging apparatus, and the imaging apparatuses 10d, 10e, 10f can be the super wide angle imaging apparatus, the wide angle imaging apparatus, and a telephoto imaging apparatus, or can be other kind of imaging apparatus, which would not be limited thereof.

11th Embodiment

Figure 19:
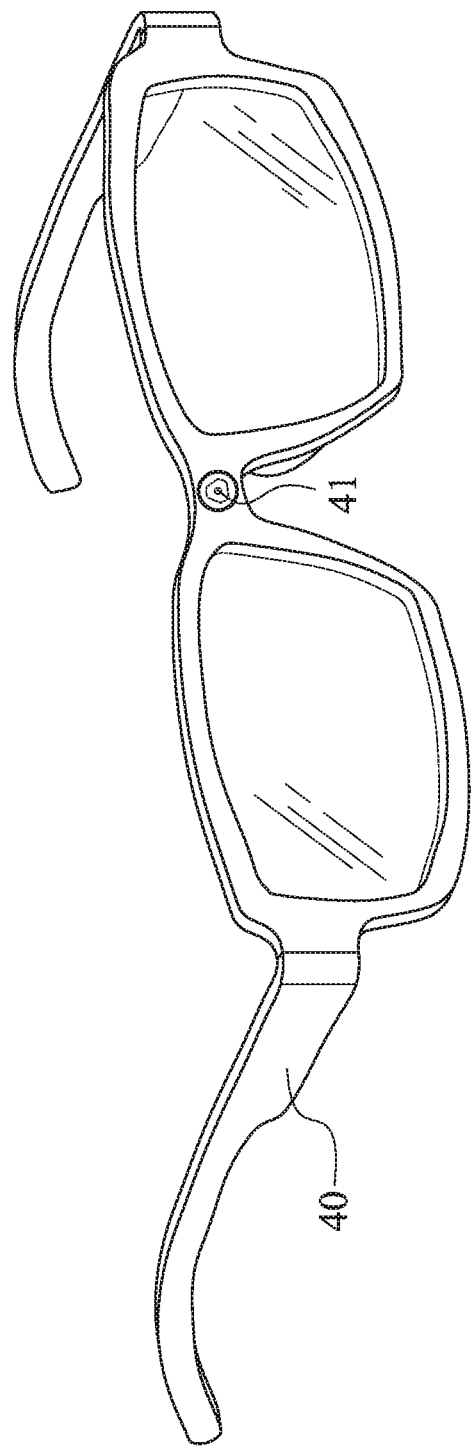
FIG. 19 is a schematic view of an electronic device according to the 11th embodiment of the present disclosure.

FIG. 19 is a schematic view of an electronic device 40 according to the 11th embodiment of the present disclosure. The electronic device 40 of the 11th embodiment is a wearable device. The electronic device 40 includes an imaging apparatus 41. The imaging apparatus 41 can be the same as that of the 8th embodiment, and will not be repeated herein.

The foregoing description, for purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens assembly comprising six lens elements, the six lens elements being, in order from an object side to an image side:
    a first lens element with negative refractive power having an object-side surface being concave in a paraxial region thereof;
    a second lens element having an image-side surface being concave in a paraxial region thereof;
    a third lens element;
    a fourth lens element;
    a fifth lens element; and
    a sixth lens element with negative refractive power having an image-side surface being concave in a paraxial region thereof and the image-side surface comprising at least one convex shape in an off-axis region thereof,
    wherein a curvature radius of the object-side surface of the first lens element is R1, a curvature radius of an image-side surface of the first lens element is R2, an Abbe number of the second lens element is V2, an Abbe number of the fourth lens element is V4, an Abbe number of the sixth lens element is V6, and the following conditions are satisfied:

$(R1+R2)/(R1-R2)<0.40$; and $10<V2+V4+V6<85$.

2. The photographing optical lens assembly of claim 1, wherein the curvature radius of the object-side surface of the first lens element is R1, the curvature radius of the image-side surface of the first lens element is R2, and the following condition is satisfied:

$-2.75<(R1+R2)/(R1-R2)\leq 0$.

3. The photographing optical lens assembly of claim 1, wherein the Abbe number of the second lens element is V2, the Abbe number of the fourth lens element is V4, the Abbe number of the sixth lens element is V6, and the following condition is satisfied:

$30<V2+V4+V6<75$.

4. The photographing optical lens assembly of claim 1, wherein a curvature radius of an object-side surface of the second lens element is R3, a curvature radius of an image-side surface of the second lens element is R4, and the following condition is satisfied:

$|R3/R4|<2.0$.

5. The photographing optical lens assembly of claim 1, wherein the object-side surface of the first lens element comprises at least one convex critical point in an off-axis region thereof.

6. The photographing optical lens assembly of claim 1, wherein a focal length of the first lens element is f1, a focal length of the sixth lens element is f6, and the following condition is satisfied:

$0.50<f1/f6<4.0$.

7. The photographing optical lens assembly of claim 1, wherein a focal length of the first lens element is f1, a focal length of the second lens element is f2, and the following condition is satisfied:

$-0.60<f1/f2$.

8. The photographing optical lens assembly of claim 1, wherein the third lens element has positive refractive power, the fourth lens element has negative refractive power, and the fifth lens element has positive refractive power.

9. The photographing optical lens assembly of claim 1, wherein a maximum optical effective radius of the object-side surface of the first lens element is Y11, a maximum optical effective radius of the image-side surface of the sixth lens element is Y62, and the following condition is satisfied:

$0.50<Y11/Y62<1.50$.

10. The photographing optical lens assembly of claim 1, wherein a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, and the following conditions are satisfied:

$1.0<|f2/f1|$;

$1.0<|f2/f3|$;

$1.0<|f2/f4|$;

$1.0<|f2/f5|$; and $1.0<|f2/f6|$.

11. The photographing optical lens assembly of claim 1, wherein a minimum value among absolute values of the curvature radii of the surfaces of each lens element of the photographing optical lens assembly is an absolute value of a curvature radius of the image-side surface of the sixth lens element.

12. The photographing optical lens assembly of claim 1, wherein a curvature radius of an object-side surface of the third lens element is R5, a curvature radius of an image-side surface of the third lens element is R6, and the following condition is satisfied:

$0<(R5+R6)/(R5-R6)<2.0$.

13. The photographing optical lens assembly of claim 1, wherein a maximum optical effective radius of the object-side surface of the first lens element is Y11, an entrance pupil diameter of the photographing optical lens assembly is EPD, and the following condition is satisfied:

$2.0<Y11/EPD<7.0$.

14. The photographing optical lens assembly of claim 1, wherein an f-number of the photographing optical lens assembly is Fno, a maximum field of view of the photographing optical lens assembly is FOV, an axial distance between the object-side surface of the first lens element and an image surface is TL, a maximum image height of the photographing optical lens assembly is ImgH, and the following conditions are satisfied:

$1.0<Fno<3.0$;

$120 \text{ degrees}<FOV$; and $1.0<TL/ImgH<2.2$.

15. An image apparatus, comprising:
the photographing optical lens assembly of claim 1; and
an image sensor disposed on an image surface of the photographing optical lens assembly.

16. An electronic device, comprising:
the image apparatus of claim 15.

17. A photographing optical lens assembly comprising six lens elements, the six lens elements being, in order from an object side to an image side:
a first lens element with negative refractive power having an object-side surface being concave in a paraxial region thereof and comprising at least one convex shape in an off-axis region thereof;
a second lens element having an image-side surface being concave in a paraxial region thereof;
a third lens element;
a fourth lens element with negative refractive power;
a fifth lens element; and
a sixth lens element having an image-side surface being concave in a paraxial region thereof and the image-side surface comprising at least one convex shape in an off-axis region thereof;
wherein a curvature radius of the object-side surface of the first lens element is R1, a curvature radius of an image-side surface of the first lens element is R2, a total number of lens elements having Abbe numbers less than 32 is V32, and the following conditions are satisfied:

$-2.75<(R1+R2)/(R1-R2)\leq 0$; and $3\leq V32$.

18. The photographing optical lens assembly of claim 17, wherein the curvature radius of the object-side surface of the first lens element is R1, the curvature radius of the image-side surface of the first lens element is R2, and the following condition is satisfied:

$-1.40<(R1+R2)/(R1-R2)<-0.30$.

19. The photographing optical lens assembly of claim 17, wherein the fifth lens element has an object-side surface being concave in a paraxial region thereof and an image-side surface being convex in a paraxial region thereof, and the sixth lens element has an object-side surface being convex in a paraxial region thereof.

20. The photographing optical lens assembly of claim 17, wherein a central thickness of the first lens element is CT1, a central thickness of the second lens element is CT2, a central thickness of the third lens element is CT3, a central thickness of the fourth lens element is CT4, a central thickness of the fifth lens element is CT5, a central thickness of the sixth lens element is CT6, and the following conditions are satisfied:

$CT4/CT1<1.0$;

$CT4/CT2<1.0$;

$CT4/CT3<1.0$;

$CT4/CT5<1.0$; and $CT4/CT6<1.0$.

21. The photographing optical lens assembly of claim 17, wherein the curvature radius of the object-side surface of the first lens element is R1, a maximum image height of the photographing optical lens assembly is ImgH, and the following condition is satisfied:

$-3.0<R1/ImgH<0$.

22. The photographing optical lens assembly of claim 17, wherein an Abbe number of the sixth lens element is V6, a refractive index of the sixth lens element is N6, and the following condition is satisfied:

$5<V6/N6<30$.

23. The photographing optical lens assembly of claim 17, wherein the third lens element has positive refractive power, the fifth lens element has positive refractive power, and the sixth lens element has negative refractive power.

24. The photographing optical lens assembly of claim 17, wherein a maximum optical effective radius of the object-side surface of the first lens element is Y11, an entrance pupil diameter of the photographing optical lens assembly is EPD, and the following condition is satisfied:

$2.0<Y11/EPD<7.0$.

25. The photographing optical lens assembly of claim 17, wherein an f-number of the photographing optical lens assembly is Fno, and the following condition is satisfied:

$1.20<Fno<2.45$.

26. An image apparatus, comprising:
the photographing optical lens assembly of claim 17; and
an image sensor disposed on an image surface of the photographing optical lens assembly.

27. An electronic device, comprising:
the image apparatus of claim 26.

* * * * *